US012159517B2

(12) United States Patent
Burtness et al.

(10) Patent No.: US 12,159,517 B2
(45) **Date of Patent: *Dec. 3, 2024**

(54) SYSTEM AND METHOD FOR CALIBRATING A WIRELESS SECURITY RANGE

(71) Applicant: InVue Security Products Inc., Charlotte, NC (US)

(72) Inventors: Kevin A. Burtness, Charlotte, NC (US); Jonathon D. Phillips, Fort Mill, SC (US); Michael R. Johnston, Waxhaw, NC (US); Jeffrey A. Grant, Charlotte, NC (US); Gary A. Taylor, Fort Mill, SC (US); William B. Howell, Charlotte, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,216

(22) Filed: Aug. 17, 2023

(65) Prior Publication Data

US 2023/0394937 A1 Dec. 7, 2023

Related U.S. Application Data

(63) Continuation of application No. 17/744,307, filed on May 13, 2022, now Pat. No. 11,749,076, which is a
(Continued)

(51) Int. Cl.

| | |
|---|---|
| ***G08B 13/12*** | (2006.01) |
| ***G08B 13/14*** | (2006.01) |
| ***G08B 25/00*** | (2006.01) |

(52) U.S. Cl.
CPC ......... *G08B 13/1409* (2013.01); *G08B 13/12* (2013.01); *G08B 13/1427* (2013.01);
(Continued)

(58) Field of Classification Search
CPC ................ G08B 13/1409; G08B 13/12; G08B 13/1427; G08B 13/1436; G08B 13/149; G08B 25/008
See application file for complete search history.

(56) References Cited

U.S. PATENT DOCUMENTS 4,293,852 A 10/1981 Rogers
1,962,369 A 10/1990 Close
(Continued)

FOREIGN PATENT DOCUMENTS

KR 1020070088852 A 8/2007
WO 2011094676 A1 8/2011
(Continued)

OTHER PUBLICATIONS

International Search Report and Written Opinion from corresponding International Application No. PCT/US2016/018191, dated Jun. 2, 2016 (8 pages).
(Continued)

*Primary Examiner* — Santiago Garcia
(74) *Attorney, Agent, or Firm* — InVue Security Products Inc.

(57) ABSTRACT

Security systems and methods for protecting portable electronic devices from theft are provided. For example, a security system includes a sensor configured to be secured to a portable electronic device, and a monitoring component configured to wirelessly communicate with the sensor and to removably support the sensor thereon, wherein the monitoring component and the sensor are configured to communicate with one another to determine a proximity of the portable electronic device relative to the monitoring component, wherein the monitoring component and/or the sensor is configured to initiate a security signal when the proximity between the monitoring component and the sensor is not within a predetermined range. The sensor and the
(Continued)

monitoring component are configured to communicate with one another for initially setting the predetermined range.

20 Claims, 14 Drawing Sheets

Related U.S. Application Data continuation of application No. 16/864,459, filed on May 1, 2020, now abandoned, which is a continuation of application No. 16/276,166, filed on Feb. 14, 2019, now abandoned, which is a continuation of application No. 15/551,460, filed as application No. PCT/US2016/018191 on Feb. 17, 2016, now Pat. No. 10,223,881.

(60) Provisional application No. 62/117,573, filed on Feb. 18, 2015.

(52) U.S. Cl.
CPC ....... *G08B 13/1436* (2013.01); *G08B 13/149* (2013.01); *G08B 25/008* (2013.01)

(56) References Cited

U.S. PATENT DOCUMENTS 5,051,725 A 9/1991 Caccitolo
5,485,163 A 1/1996 Singer et al.
5,515,419 A 5/1996 Sheffer
5,661,460 A 8/1997 Sallen et al.
5,796,338 A 8/1998 Mardirossian
5,963,131 A 10/1999 D'Angelo et al.
6,072,393 A 6/2000 Todd
6,133,380 A 10/2000 Yamada et al.
6,133,830 A 10/2000 D'Angelo et al.
6,255,958 B1 7/2001 Haimovich et al.
6,265,974 B1 7/2001 D'Angelo et al.
6,529,131 B2 3/2003 Wentworth
6,577,239 B2 6/2003 Jespersen
6,992,585 B2 1/2006 Saleh et al.
7,009,512 B2 3/2006 Cordoba
7,061,385 B2 6/2006 Fong et al.
7,190,264 B2 3/2007 Brown et al.
7,218,226 B2 5/2007 Wehrenberg
7,312,711 B2 12/2007 Fong et al.
7,375,638 B2 5/2008 Light et al.
7,535,369 B2 5/2009 Fong et al.
7,667,601 B2 2/2010 Rabinowitz et al.
7,701,339 B2 4/2010 Irmscher et al.
7,778,649 B2 8/2010 Sharony et al.
7,944,359 B2 5/2011 Fong et al.
7,961,092 B2 6/2011 Freathy et al.
8,106,772 B2 1/2012 Irmscher et al.
8,115,623 B1 2/2012 Green
8,212,672 B2 7/2012 Brenner
8,368,546 B2 2/2013 Fong et al.
8,451,115 B2 5/2013 Mukai et al.
8,452,868 B2 5/2013 Shafer et al.
RE44,433 E 8/2013 Fong et al.
8,508,367 B2 8/2013 Shafer
8,521,134 B2 8/2013 Huckins
8,525,688 B2 9/2013 Chatterjee et al.
8,542,120 B2 9/2013 Brenner
8,552,708 B2 10/2013 de Rochemont
8,577,294 B2 11/2013 Causey et al.
8,643,486 B2 2/2014 Hess
8,830,061 B2 9/2014 Malhotra
8,878,673 B2 11/2014 Grant et al.
9,437,088 B2 * 9/2016 Phillips .............. G08B 13/1427
9,567,776 B2 * 2/2017 Moock ................ E05B 73/0082
9,728,054 B2 8/2017 Grant et al.
9,818,274 B2 * 11/2017 Fawcett ............ G08B 13/1463
10,096,216 B1 10/2018 McClintock
10,223,881 B2 3/2019 Burtness et al.
2001/0038330 A1 11/2001 Garcia
2003/0043036 A1 3/2003 Merrem et al.
2003/0206106 A1 11/2003 Deconinck et al.
2004/0145471 A1 7/2004 Lawrenson et al.
2005/0040229 A1 2/2005 Andrews et al.
2005/0062604 A1 3/2005 Fong et al.
2006/0097875 A1 5/2006 Ott
2007/0035391 A1 2/2007 Hamzy
2007/0080806 A1 4/2007 Lax
2007/0146133 A1 6/2007 Wehrenberg
2007/0210930 A1 9/2007 Pyo et al.
2007/0229259 A1 10/2007 Irmscher et al.
2007/0273513 A1 * 11/2007 White ..................... G07F 11/62
340/568.8
2008/0060241 A1 3/2008 Molinaro
2008/0204239 A1 8/2008 Marszalek et al.
2009/0011713 A1 1/2009 Abusubaih et al.
2009/0033492 A1 2/2009 Rapp et al.
2009/0079566 A1 3/2009 Goldstein et al.
2009/0156126 A1 6/2009 Willis
2009/0174544 A1 7/2009 Allen et al.
2009/0207014 A1 8/2009 Ayed
2010/0156624 A1 6/2010 Hounsell
2010/0191651 A1 7/2010 Irmscher et al.
2010/0194568 A1 * 8/2010 Irmscher ................. A47F 3/002
340/568.3
2011/0012743 A1 * 1/2011 Van Gorp ............. G08C 17/02
340/686.6
2011/0068906 A1 3/2011 Shafer et al.
2011/0068921 A1 3/2011 Shafer
2011/0074582 A1 3/2011 Alexis
2011/0084838 A1 4/2011 Fawcett
2011/0100073 A1 * 5/2011 Johnston ............. E05B 73/0082
70/57.1
2011/0215060 A1 9/2011 Niederhuefner
2011/0254661 A1 10/2011 Fawcett et al.
2011/0279252 A1 11/2011 Carter et al.
2012/0019383 A1 1/2012 Fawcett et al.
2012/0038456 A1 2/2012 Pikkarainen et al.
2012/0077513 A1 3/2012 Rizzello et al.
2012/0126981 A1 5/2012 Bawamia et al.
2012/0192600 A1 8/2012 Johnston et al.
2012/0218109 A1 8/2012 Tatsumi et al.
2012/0268103 A1 10/2012 Henson et al.
2012/0293330 A1 * 11/2012 Grant ................. G08B 13/1427
340/568.8
2013/0029661 A1 1/2013 Fong et al.
2013/0029694 A1 1/2013 Fong et al.
2013/0033380 A1 2/2013 Fawcett et al.
2013/0106592 A1 5/2013 Morgan et al.
2013/0154843 A1 6/2013 Lan
2013/0169434 A1 7/2013 McCown et al.
2013/0225127 A1 8/2013 Cavacuti et al.
2013/0241731 A1 9/2013 Fawcett et al.
2013/0257616 A1 10/2013 Taylor et al.
2014/0073262 A1 3/2014 Gutierrez et al.
2014/0118145 A1 * 5/2014 Wawrzyniak ...... G08B 13/1427
340/568.8
2014/0152440 A1 * 6/2014 Berglund ........... G08B 13/1463
340/568.2
2014/0173439 A1 6/2014 Gutierrez et al.
2014/0266725 A1 * 9/2014 Berglund ............... G08B 13/14
340/568.8
2014/0300467 A1 10/2014 Ho
2014/0362517 A1 * 12/2014 Moock ................ E05B 73/0082
361/679.43
2015/0009034 A1 1/2015 Grant et al.
2015/0180866 A1 1/2015 Hama
2015/0091729 A1 4/2015 Phillips et al.
2016/0253882 A1 * 9/2016 Taylor ................ G08B 13/1445
340/538.17
2016/0351029 A1 * 12/2016 Fawcett ............. G08B 13/1481
2016/0371944 A1 * 12/2016 Phillips ............. G08B 13/1427
2017/0116831 A1 4/2017 Fawcett et al.
2017/0148288 A1 * 5/2017 Baker ................ G08B 13/1445
2017/0276289 A1 * 9/2017 Phillips ................. H02J 7/0044

(56) References Cited

U.S. PATENT DOCUMENTS

| | | | | |
|---|---|---|---|---|
| 2017/0372577 | A1* | 12/2017 | Lax | G08B 13/19645 |
| 2018/0047263 | A1 | 2/2018 | Burtness et al. | |
| 2019/0180580 | A1 | 6/2019 | Burtness et al. | |

FOREIGN PATENT DOCUMENTS

| | | | |
|---|---|---|---|
| WO | 2012159102 | A1 | 11/2012 |
| WO | 2013023091 | A1 | 2/2013 |

OTHER PUBLICATIONS

Extended European Search Report from related European Patent Application No. 14848491.8, dated Jul. 5, 2017 (8 pages).

Alexandra Voyé-Piccoli, "The International Search Report and the Written Opinion of the International Searching Authority, or the Declaration for International Application No. PCT/US2012/038764 filed on May 21, 2012", Oct. 31, 2012, 20 pages, European Patent Office, Rijswijk, Netherlands.

Chris Griffith, "Light on the till—the future of shopping with Beacons and Bluetooth", Sep. 26, 2013, pp. 1-3, The Australian, http://www.theaustralian.com.au.

"Estimote Beacon is a tiny computer", Oct. 2, 2013, pp. 1-7, Estimote, Inc., http://estimote.com.

Simon Hay and Robert Harle, "Bluetooth Tracking without Discoverability", University of Cambridge Computer Laboratory, Location and Contex Awareness, 2009, pp. 120-137.

Masataka Kikawa, et al., "A Presence-detection Method using RSSI of a Bluetooth Device", International Journal of Informatics Society, vol. 2, No. 1, 2010, pp. 23-31.

Chuan-Chin Pu, et al., "Indoor Location Tracking using Received Signal Strength Indicator", Engineering Communications for Wireless Sensor Networks, www.intechopen.com, 2011, pp. 229-256.

Silke Feldmann, et al., "An indoor Bluetooth-based positioning system: concept, Implementation and experimental evaluation", Institute of Communications Engineering, International Conference on Wireless Networks, 5 pages, 2003.

Ana Zapater, et al., "Development and Implementation of a Bluetooth Networking Infrastructure for the a Notebook—University Scenario", Institute of Communications Engineering, University of Hanover, 8 pages, 2003.

Yapeng Wang, et al., "Bluetooth Indoor Positioning using RSSI and Least Square Estimation", International Conference on Future Computer and Communications, 5 pages, 2010.

Blaine R. Copenheaver, "Notification of Transmittal of the International Search Report and the Written Opinion of the International Searching Authority, or the Declaration for International Application No. PCT/US2014/057197 filed on Sep. 24, 2014", Dec. 24, 2014, 10 pages, Commissioner for Patents, Alexandria, Virginia, USA.

* cited by examiner

SYSTEM AND METHOD FOR CALIBRATING A WIRELESS SECURITY RANGE

CROSS REFERENCE TO RELATED APPLICATIONS

The present application is a continuation of U.S. application Ser. No. 17/744,307, filed on May 13, 2022, which is a continuation of U.S. application Ser. No. 16/864,459, filed on May 1, 2020, which is a continuation of U.S. application Ser. No. 16/276,166, filed on Feb. 14, 2019, which is a continuation of U.S. application Ser. No. 15/551,460, filed on Aug. 16, 2017, and now U.S. Pat. No. 10,223,881, which is a national phase entry of International Application No. PCT/US2016/018191, filed Feb. 17, 2016, which claims priority to U.S. Provisional Application No. 62/117,573, filed Feb. 18, 2015, the entire contents of each of which are incorporated by reference herein.

FIELD OF THE INVENTION

The present invention relates generally to merchandise security, and, more particularly, to systems and methods for protecting retail display merchandise from theft.

BACKGROUND OF THE INVENTION

Displays for retail merchandise utilize different types of theft deterrent security systems and methods to discourage shoplifters. Many of these systems and methods include sensors and alarms that are mechanically attached, or sensors and alarms that are mechanically attached and electrically connected, to the item of merchandise to be protected. When the integrity of the display is compromised, such as by cutting or removing a cable that extends between the security system and the item of merchandise, or by separating the item of merchandise from the security system, an alarm is activated to alert store personnel of a potential theft situation. Thus, conventional security systems having mechanical or electro-mechanical cables tethered to an item of merchandise, and other security systems that are physically attached to an item of merchandise, provide visual security at the expense of restricting a potential purchaser's ability to interact freely with the merchandise. Consequently, conventional systems that provide visual security suffer from the disadvantage of providing a reduced "customer experience" for a potential purchaser of the merchandise.

Thus, a need exists for a security system and method that is not mechanically or electro-mechanically tethered to an item of merchandise, yet can be configured for protecting various items of retail display merchandise from theft. A further, and more specific, need exists for a security system and method that provides an improved customer experience for a potential purchaser of retail display merchandise.

SUMMARY OF THE INVENTION

In one aspect, the invention is embodied by a security system configured for securing an item of merchandise from theft. The security system includes a sensor configured to removably engage an input port of an item of merchandise, and a monitoring component configured to wirelessly communicate with the sensor and to removably support the sensor on the monitoring component. The monitoring component and the sensor are configured to communicate with one another to determine a proximity of the item of merchandise relative to the monitoring component. The monitoring component and/or the sensor is further configured to initiate a security signal when the proximity between the monitoring component and the sensor is not within a predetermined range. The monitoring component and/or the sensor is still further configured to initiate a security signal in response to the sensor being removed from the input port of the item of merchandise.

In another aspect, a security system includes a sensor configured to be secured to an item of merchandise, and a monitoring component configured to wirelessly communicate with the sensor and to removably support the sensor thereon, wherein the monitoring component and the sensor are configured to communicate with one another to determine a proximity of the item of merchandise relative to the monitoring component, wherein the monitoring component and/or the sensor is configured to initiate a security signal when the proximity between the monitoring component and the sensor is not within a predetermined range. The sensor and the monitoring component are configured to communicate with one another for initially setting the predetermined range.

In another aspect, the invention is embodied by a method for securing an item of merchandise from theft. The method includes wirelessly communicating between a monitoring component and a sensor, the sensor being removably engaged with an input port of an item of merchandise. The method further includes determining a proximity of the item of merchandise relative to the monitoring component. The method further includes initiating a first security signal at the monitoring component and/or sensor when the proximity between the monitoring component and the sensor is not within a predetermined range. The method further includes initiating a second security signal at the monitoring component and/or sensor in response to the sensor being removed from the input port of the item of merchandise.

In another embodiment, a method for securing an item of merchandise from theft is provided. The method includes wirelessly communicating between a monitoring component and a sensor and initially setting a predetermined range in response to communication between the sensor and the monitoring component. The method further includes determining a proximity of the item of merchandise relative to the monitoring component and initiating a security signal at the monitoring component and/or sensor when the proximity between the monitoring component and the sensor is not within the predetermined range.

In one embodiment, a security system includes a sensor configured to be coupled to a portable electronic device and a monitoring component configured to wirelessly communicate with the sensor. The monitoring component and the sensor are configured to communicate with one another to determine a proximity of the portable electronic device relative to the monitoring component. Moreover, the monitoring component and/or the sensor is configured to initiate a security signal when the proximity between the monitoring component and the sensor is not within a predetermined range. The sensor and the monitoring component are configured to communicate with one another for initially setting the predetermined range.

In another embodiment, a method includes wirelessly communicating between a monitoring component and a sensor initially setting a predetermined range in response to communication between the sensor and the monitoring component. The method further includes determining a proximity of the portable electronic device relative to the monitoring component and initiating a security signal at the monitoring component and/or sensor when the proximity between the monitoring component and the sensor is not within the predetermined range.

In one embodiment, a security system includes a sensor configured to be coupled to a portable electronic device and a key configured to communicate with the sensor. The security system also includes a monitoring component configured to communicate (e.g., wirelessly) with the sensor. The sensor and the key are configured to communicate (e.g., wirelessly) with one another to initiate a calibration routine, and the sensor and the monitoring component are configured to communicate with one another in response to initiating the calibration routine for initially setting a predetermined range (e.g., distance) between the sensor and the monitoring component.

BRIEF DESCRIPTION OF THE DRAWINGS

The detailed description of the invention provided hereafter may be better understood with reference to the accompanying drawing figures, which depict embodiments of merchandise security systems and methods for protecting retail display merchandise from theft.

DETAILED DESCRIPTION OF THE INVENTION

The present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notations are used to indicate similar elements in alternative embodiments.

Figure 1:
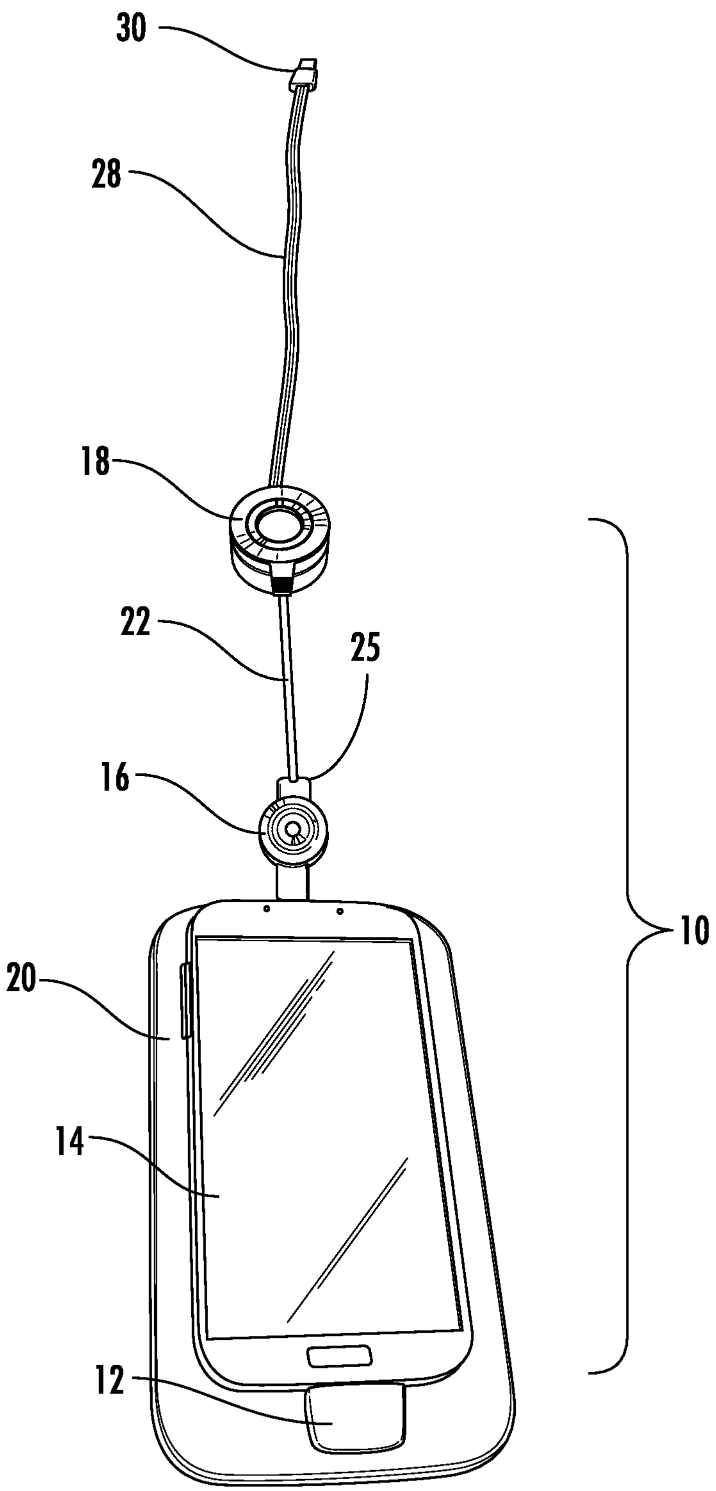
FIG. 1 is perspective view of a security system configured for securing an item of merchandise from theft in a retail display according to one embodiment of the invention.

FIG. 1 illustrates one embodiment of a security system 10 configured to secure an item of merchandise from theft in a retail display. The security system may generally include a sensor 12 configured to be coupled to an item of merchandise 14, and a monitoring device 16 configured to wirelessly communicate with the sensor and/or the item of merchandise. The security system 10 may further include an alarm module 18 in electrical communication with the monitoring device 16. The monitoring device 16 and the sensor 12 may be configured to communicate with one another to determine the proximity of the item of merchandise 14 relative to the monitoring device. Moreover, the monitoring device 16 may be configured to determine a proximity range between the sensor 12 and the monitoring device, wherein the proximity range may be indicative of the strength of communication between the sensor and the monitoring device. The alarm module 18 may be configured to generate a security signal when the proximity between the monitoring device 16 and the sensor 12 is not within the proximity range. In some embodiments, the security system 10 may also include a charging station or device 20 for charging the monitoring device 16, the item of merchandise 14, and/or the sensor 12.

The item of merchandise 14 may be any portable electronic device, such as a mobile or cellular phone, a Smartphone, a tablet, notebook, laptop computer, or the like. One advantage of the security system 10 is that the item of merchandise 14 is not required to be mechanically tethered to a display stand, support or the like. Thus, a consumer is free to examine the item of merchandise 14 without any physical restraints. As will be explained in further detail below, the monitoring device 16 may be configured to communicate with the sensor 12 and/or the item of merchandise 14 to establish a "wireless tether," such that although physical security is not provided, wireless security is provided. As a result, the security system 10 provides for an improved or increased "customer experience," and thereby increases the likelihood of the customer purchasing the item of merchandise 14, while reducing the possibility of theft of the merchandise. In particular, mechanical and electromechanical tethered security devices that include cords, cables, etc. may interfere with the customer experience by restricting the ability of the potential purchaser to freely interact with the item of merchandise. Furthermore, although the security system 10 is described herein in relation to a merchandise display in a retail store, it is understood that a security system 10 according to the invention is applicable to any number of environments, such as in hospitals, restaurants, etc.

Figure 3:
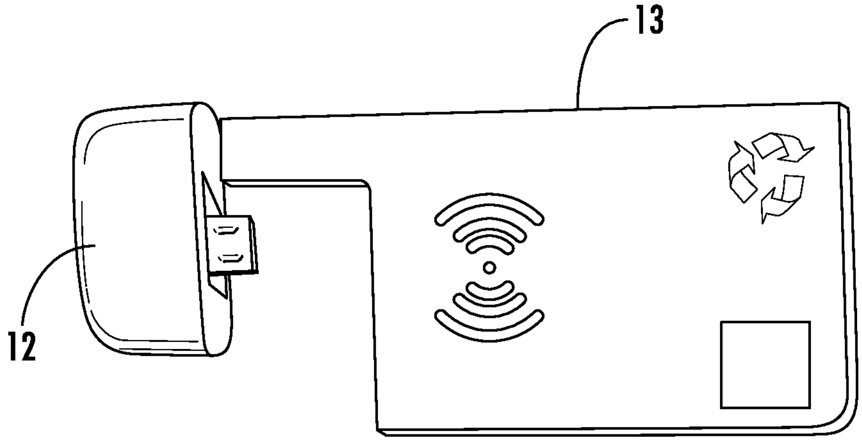
FIG. 3 is a plan view of a sensor and a power adapter configured for use with the security system shown in FIG. 1 according to one embodiment of the invention.

The sensor 12 of the security system 10 is configured to be engaged with and disengaged from the item of merchandise 14. As such, the sensor 12 may be removably engaged with the item of merchandise 14, for example, by being inserted within an input port of the item of merchandise. As such, the sensor 12 may include a connector (see, e.g., FIG. 3) configured for engaging an input port provided on the item of merchandise 14. By way of example and not limitation, the input port could be a standard input port provided on the item of merchandise 14, such as a USB port, micro-USB port, or the like. The input port may be the same port used for power and/or data transfer with the item of merchandise. In some embodiments, the sensor 12 and the item of merchandise 14 are in electrical communication with one another when the sensor is engaged with the input port of the item of merchandise. In other embodiments, the sensor 12 may include a proximity mechanism (e.g., a pressure or plunger switch) that is configured to detect when the sensor is not engaged with the input port of the item of merchandise 14, for example, when the sensor has been removed from the item of merchandise, and/or to detect removal of the sensor from the back of the item of merchandise. Although shown as being separate components, it is understood that the sensor 12 could be integrated into the item of merchandise 14 so that the sensor is not required to be engaged with the input port. As such, the sensor 12 may be integrated with or coupled to the item of merchandise 14. In one embodiment, the sensor 12 is configured to receive power from the item of merchandise 14. For example, the item of merchandise 14 may include a battery that is configured to transfer power to the sensor 12 when the sensor is operably engaged with the merchandise. As such, the sensor 12 does not require its own power source for operation.

In some embodiments, the sensor 12 comprises a power source, such as a battery. In this case, the sensor 12 may be operable for detecting when it is removed from the item of merchandise 14. For example, the sensor 12 may establish a sense loop between the sensor and the item of merchandise 14, such that when the sensor is removed, the sense loop is interrupted. The sensor 12 may then be configured to communicate with the monitoring device 16 and/or the item of merchandise 14 to initiate or otherwise generate a security signal. In the instance where power is lost to the item of merchandise 14, the power source of the sensor 12 will reduce false alarms. In some embodiments, the sensor 12 may be configured to determine whether the loss of power to the item of merchandise 14 was authorized or unauthorized. A natural loss of power could be, for example, the item of merchandise 14 being powered down in an authorized manner, while an unnatural loss of power could be indicative of a battery being removed from the item of merchandise or the sensor 12 being removed from the item of merchandise. When engaged with the item of merchandise 14, the sensor 12 may be configured to monitor the data lines of the item of merchandise to determine whether the loss of power is natural (authorized) or unnatural (unauthorized). In one example, when an item of merchandise 14 is powered down naturally, the sensor 12 may monitor the data lines to confirm that a natural power loss has occurred. However, when power is abruptly lost, the sensor 12 may be configured to transmit a signal to the monitoring device 16 to initiate or otherwise generate a security signal. Because the sensor 12 includes a power source in this embodiment, the sensor may utilize its own power source to transmit a signal to the monitoring device 16.

The sensor 12 may include communications circuitry for communicating with the monitoring device 16. For example, the communications circuitry of the sensor 12 may be configured to wirelessly communicate with the monitoring device 16 using any desired communications protocol such as, for example, Bluetooth wireless communication, Bluetooth Low Energy ("BLE") wireless communication, WiFi wireless communication, cellular wireless communication, received signal strength indicator ("RSSI"), ultra-wideband time of flight, and/or ambient backscatter. Similarly, the monitoring device 16 may include complementary communications circuitry for communicating with the sensor 12. In one embodiment, the wireless communications circuitry carried by the sensor 12 and/or the monitoring device 16 may include, for example, one or more wireless transceivers for transmitting and receiving wireless communications.

Figure 2:
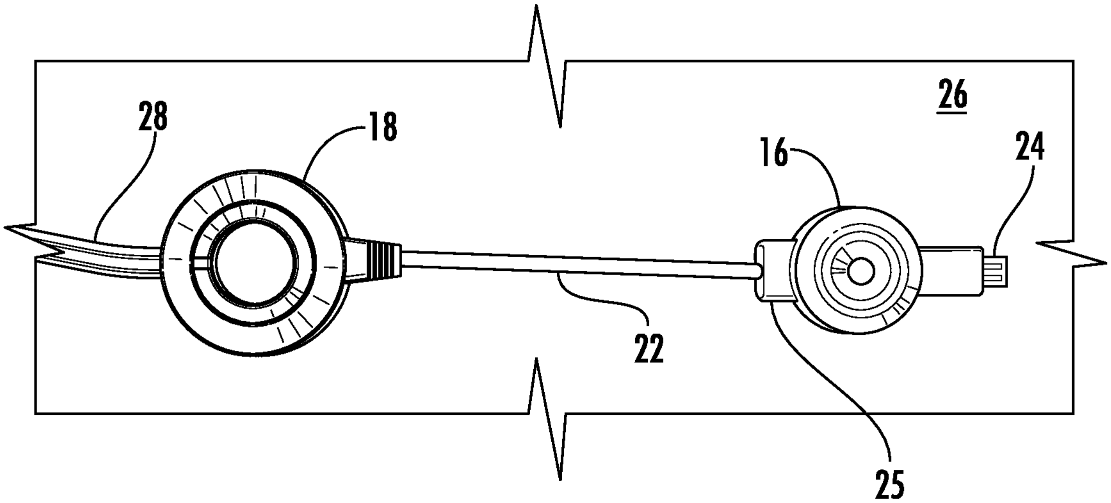
FIG. 2 is a plan view of the monitoring device and the alarm module of the security system shown in FIG. 1.

The monitoring device 16, sometimes referred to as a "watch tower", may be configured to communicate wirelessly with the sensor 12 and/or the item of merchandise 14. In addition, the monitoring device 16 may include a connector 24 that is configured to engage an input port provided on the charging device 20, as shown in FIG. 2. Thus, when engaged, the monitoring device 16 and the charging device 20 may be in electrical communication with one another. The connector 24 may be a releasable connector, such as, for example, a micro-USB connector, USB connector, or any other suitable connector configured for engaging with the input port in a friction fit. The monitoring device 16 may include a battery, which may be used for back-up power should power provided from an external power source be lost. Furthermore, the monitoring device 16 may be secured to a merchandise display surface 26, such as a display counter, shelf, fixture, or the like using any suitable technique such as adhesives and/or fasteners. It is understood that the sensor 12 could function as a watch tower and communicate with the monitoring device 16 in a similar manner. Thus, the functionality of the sensor 12 and the monitoring device 16 could be reversed if desired. Furthermore, both the sensor 12 and the monitoring device 16 could be configured to function as a watch tower. For example, both the sensor 12 and the monitoring device 16 may be configured to collect data (e.g., RSSI data) and communicate with one another to determine a position of the item of merchandise 14 relative to the sensor and/or the monitoring device. According to one embodiment, the position of the sensor 12 relative to the monitoring device 16 may be implemented using similar techniques as that described in U.S. patent application Ser. No. 14/495,013, entitled Systems and Methods for Protecting Retail Display Merchandise From Theft, the content of which is incorporated by reference herein in its entirety.

In some embodiments, the monitoring device 16 includes a controller and wireless communications circuitry coupled to the controller. The monitoring device 16 may be paired, for example, by wireless communication (e.g. Bluetooth, BLE, RF, IR, etc.), with the sensor 12 and/or the item of merchandise 14. As such, the sensor 12 and/or the item of merchandise 14 is configured to communicate, via its respective wireless communications circuitry, with the monitoring device 16 via its wireless communications circuitry. In other words, the sensor 12 and/or the item of merchandise 14 may be paired with a monitoring device 16 by way of wireless communications.

As previously mentioned, in some embodiments the monitoring device 16 may be conceptually thought of as a "watch tower." As explained in further detail below, if the strength of communication between the monitoring device 16 and the sensor 12 decreases, or communication has been lost, the monitoring device may communicate with the alarm module 18, wherein the alarm module may generate a security signal that is indicative of an unsecured state or condition, for example, an audio, visual, and/or haptic alarm. The monitoring device 16 may also communicate, via the wireless communications circuitry, to the sensor 12 to activate a respective output device of the sensor and/or the item of merchandise 14 (i.e., a dual alarm condition) so that security personnel are able to identify the sensor of a particular item of merchandise communicating a security signal.

In one embodiment, the alarm module 18 is electrically connected to the monitoring device 16 and to an external power source. For example with reference to FIG. 2, the alarm module may include a cable 28 having one or more conductors for transmitting power to the alarm module, the monitoring device 16, the charging device 20, the sensor 12, and/or the item of merchandise 14. The monitoring device 16 may be electrically connected to the alarm module 18 with a cable 22 having one or more electrical conductors for transmitting power, data, state (e.g., short or resistor value), and/or security signals between the monitoring device and the alarm module. In one embodiment, the alarm module 18 includes a first connector 30 (see, FIG. 1) at an end of cable 22 that is configured to directly or indirectly couple to an external power source, such as a computing device (e.g., a PC or portable computer), a power outlet, or a wall power adapter at one end, and a second connector 25 at the opposite end of the cable 22 for operably engaging the monitoring device 16. Thus, the alarm module 18 may have a connector 25 that is compatible with an input port provided on the monitoring device 16. As a result, the alarm module 18 both mechanically and electrically connects the monitoring device 16 to a power source. The alarm module 18 may be operably engaged with the cable 22 and/or the cable 28 in a variety of manners. For example, the alarm module 18 may be hardwired to an end of the cables 22, 28 and have internal conductors configured to cooperate with conductors within the cables. Alternatively, each cable 22, 28 may plug into the alarm module 18. In another embodiment, a single continuous cable may extend through the alarm module 18 and be configured to communicate with the alarm module. The monitoring device 16 is illustrated as being electrically coupled to the alarm module 18 with a cable 22. However, it is understood that the monitoring device 16 and the alarm module 18 instead may be integrated together as a single combined unit, if desired.

The alarm module 18 may include an alarm that will generate a security signal, such as an audible and/or visual alarm. The alarm module 18 may include an alarm for generating a security signal in response to various security events (e.g., unplugging/cutting a cable, disconnecting the monitoring device 16, disconnecting the sensor 12, etc.). For example, the alarm module 18 may include a piezoelectric alarm to generate an audible alarm signal, as well as circuitry for detecting a security event. The alarm module 18 could also be configured to generate a visible alarm signal, or provide other visible indicators (e.g., armed or alarming), such as with a light-emitting diode ("LED"). The alarm module 18 may be further configured to detect a connection of either connector to the monitoring device 16 and/or the external power source. The alarm module 18 may further include an internal power source configured to provide power to the alarm module in the event that power from an external power source is interrupted or lost. In one embodiment, the internal power source is a rechargeable battery that is recharged by power supplied by the remote power source.

In some embodiments, the security system 10 includes a charging device 20 as illustrated in FIG. 1. The charging device 20 may be configured to charge the sensor 12 and/or the item of merchandise 14. Various techniques for transferring power may be employed, such as capacitive contact charging, inductive charging, or wired charging. In one example, the charging device and the item of merchandise have wireless "qi" compliant battery charging capability that incorporate magnetic inductive coils to transfer electrical power from the charging device 20 to the item of merchandise 14 in a known manner. The charging device 20 may stand alone, or alternatively, may be permanently attached to, removably attached to, or otherwise operably coupled with a docking station, a display stand, an alarm module, a base or the like. In one embodiment, the monitoring device 16 may incorporate charging functionality such that the monitoring device and the charging device 20 may be a single integrated device. In addition, it is understood that the charging device 20 may be optional in some embodiments where the item of merchandise 14 is not charged when in the display or "home" position.

The item of merchandise 14 may be "qi" compliant and include appropriate hardware for communicating with the charging device 20. Alternatively, the sensor 12 may be "qi" compliant such that the item of merchandise 14 is not required to be "qi" compliant, and further, no additional hardware is required for charging the item of merchandise in the retail display environment (e.g., a power adapter cable). For example, in the embodiment shown in FIG. 3, the sensor 12 includes a power adapter 13 that is in electrical communication with the sensor. The power adapter 13 may include an inductive coil for inductively receiving power transferred from the charging device 20, which in turn provides power to the sensor 12. The sensor 12 may be configured to transfer power directly from the power adapter 13 to the item of merchandise 14. As such, the power adapter 13 may be utilized to power and/or charge items of merchandise 14 that do not include inductive or other wireless charging capability.

In some embodiments, the alarm module 18 and/or sensor 12 can be armed, disarmed, and/or silenced with a security key, which may utilize mechanical, wireless, and/or electrical communication between the component(s) of the security system 10 and the security key. For example, the security key may be configured to wirelessly communicate a security code to the alarm module 18 and/or sensor 12, such as by infrared ("IR"), optical, acoustic, or inductive communication. For example, the alarm module 18 may include a port 32, window, or the like (e.g., FIG. 4) that is configured to transmit and/or receive wireless signals from the security key. In one particular embodiment, the security key is similar to that disclosed in U.S. Pat. No. 7,737,845, entitled Programmable Key for a Security System for Protecting Merchandise, the entire disclosure of which is incorporated herein by reference. In additional embodiments, the alarm module 18 and/or sensor 12 may include near field communication ("NFC") functionality and may be configured to communicate with a security key or other device having NFC functionality for arming and disarming the alarm of the alarm module. Alternatively, the alarm module 18 and/or sensor 12 may include "screen swipe" functionality and/or be configured to sense particular movement or motion to arm and/or disarm the alarm module. Likewise, the alarm module 18 and/or sensor 12 may include biometric functionality for recognizing a particular user to arm and/or disarm the alarm of the alarm module.

Figure 4:
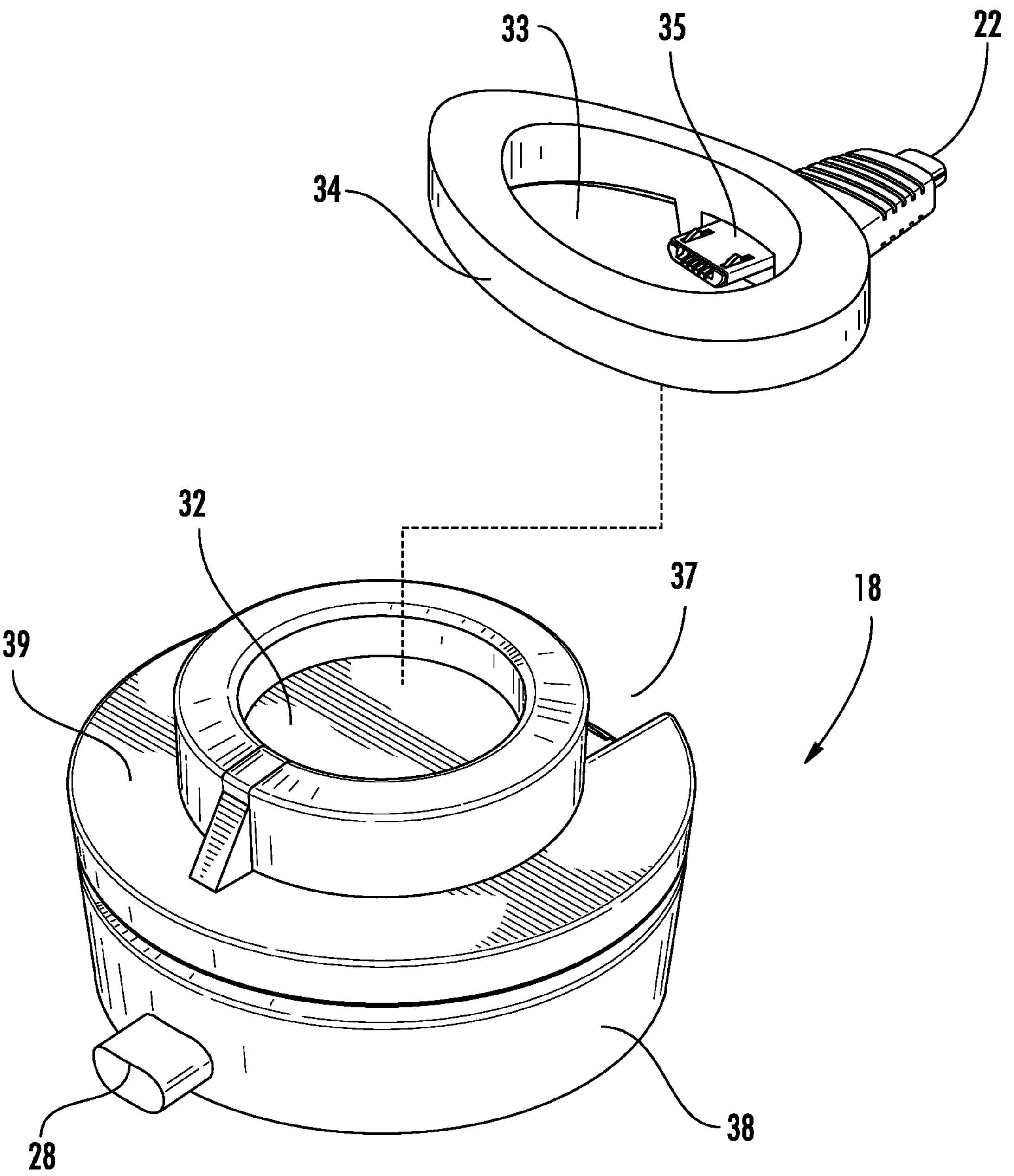
FIG. 4 is an exploded view of an alarm module and a connector configured for use with the security system shown in FIG. 1 according to one embodiment of the invention.
Figure 5:
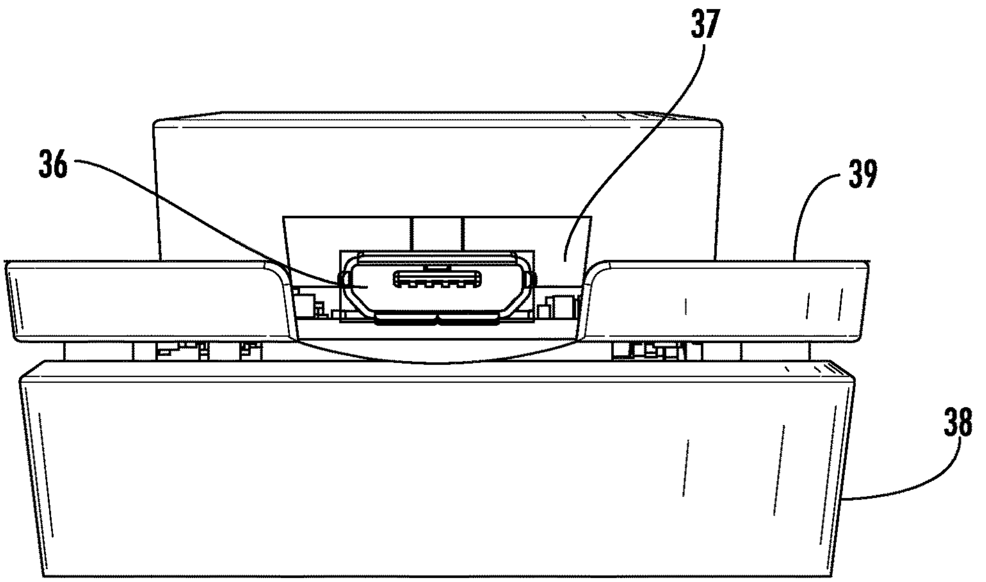
FIG. 5 is a side view of the alarm module shown in FIG. 4.
Figure 6:
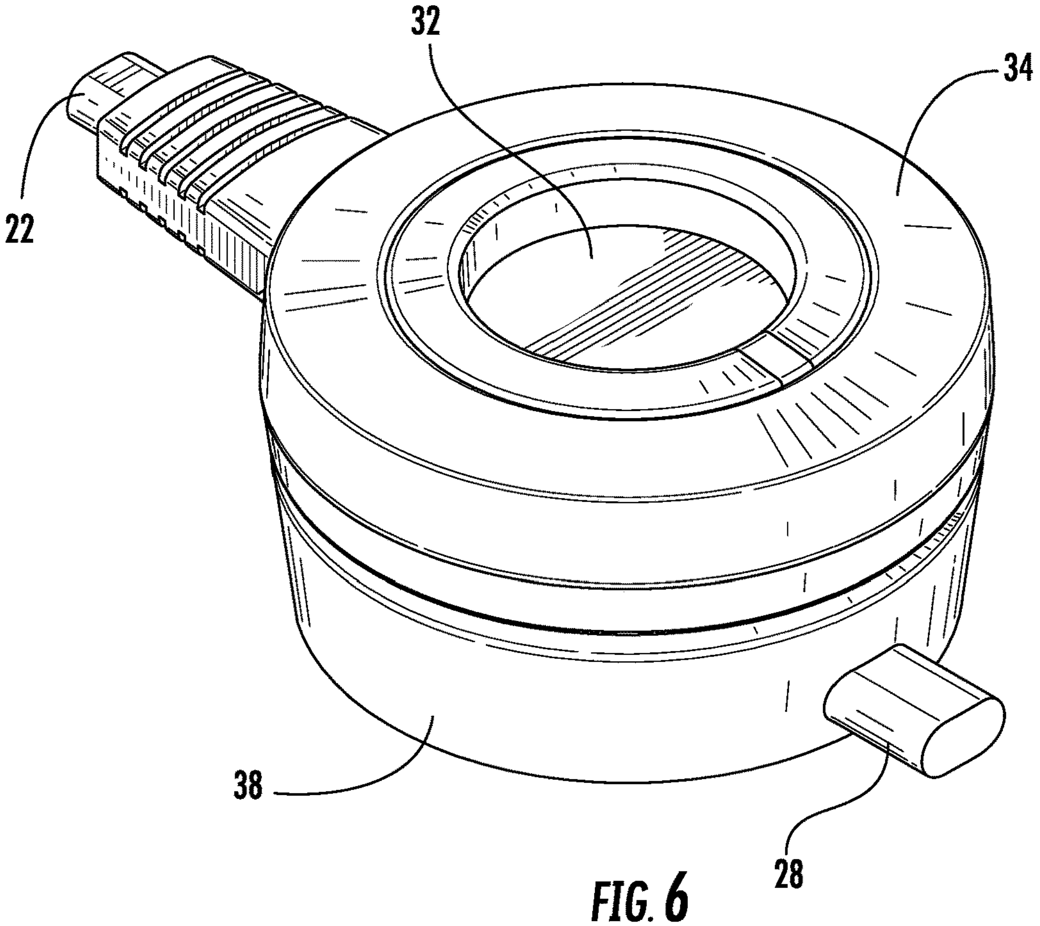
FIG. 6 is a perspective view of the connector and the alarm module shown in FIG. 4 in an assembled configuration.
Figure 7:
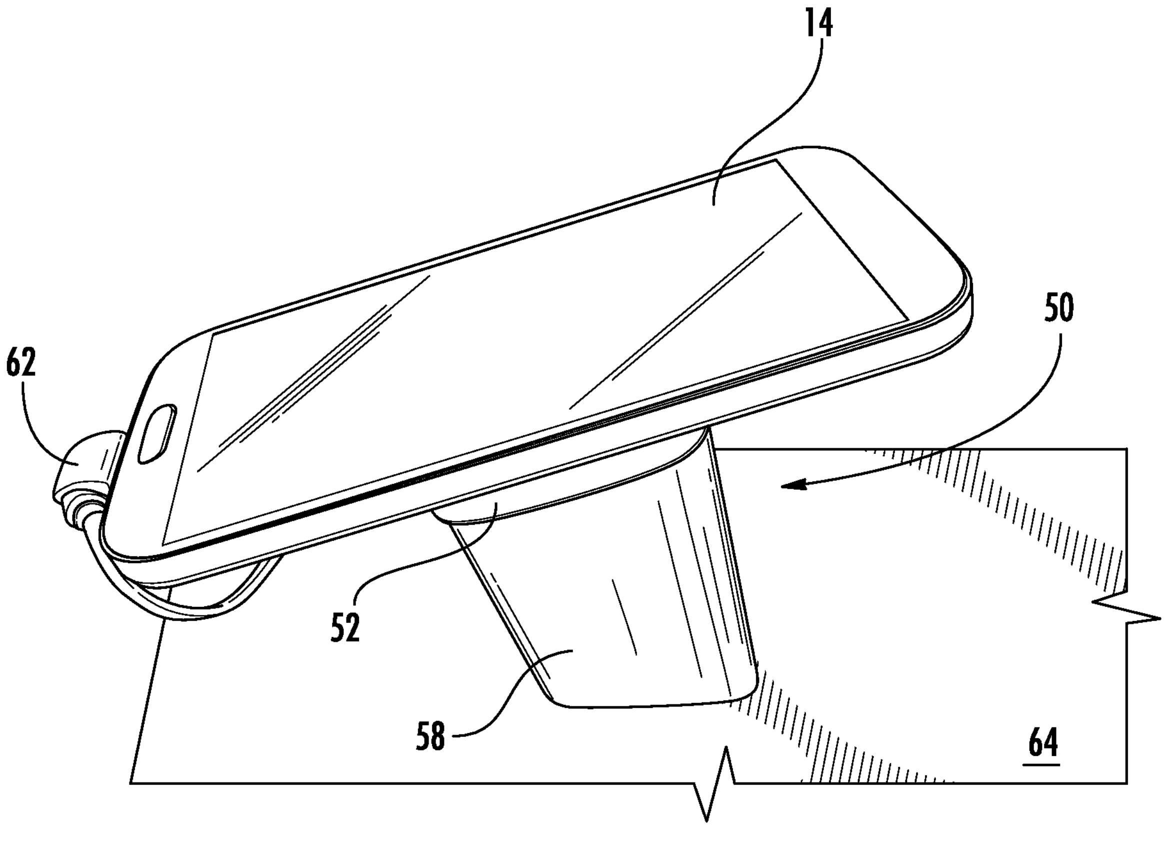
FIG. 7 is a perspective view of a security system configured for securing an item of merchandise from theft in a retail display according to another embodiment of the invention.

FIGS. 4-6 illustrate one embodiment of an alarm module 18 according to the invention. In this regard, FIG. 4 shows an alarm module 18 including a connector 34 coupled to the cable 22 and FIG. 5 shows a connection member 36 coupled to a base 38 of the alarm module. For example, the connector 34 may include a connection member 35, such as a male micro-USB connector or any suitable type of connector. The connection member 36 on the base 38 may be located on a radial surface of the base. In one example, the upper surface of the base may define a slot 37, and the connection member 35 of connector 34 may be aligned with the slot 37 for engaging with the mating connection member 36. The connection member 35 of the connector 34 may be located within the opening 33 of a ring-shaped connector. For example, the connection member may extend radially inward within the opening. Thus, the connection member 35 of the connector 34 may be configured to be inserted within the slot 37 and into the connection member 36 of the base 38. In one embodiment, the connector 34 is made of a resilient, elastic, and/or flexible material (e.g., rubber) to facilitate engagement of the connection member 35 with the connection member 36. In this regard, FIG. 4 illustrates an example wherein the connector 34 is resilient so that the connector may be manipulated in such a way as to allow the connection member 35 and the connection member 36 to engage with one another. FIG. 6 shows the connector 34 and the base 38 mated with one another. Thus, when engaged with one another, the connection members 35, 36 are not visible to a user. In addition, the outer diameters of the connector 34 and the upper surface 39 of the base 38 may be substantially the same so that the connector 34 and the alarm module 18 are a cohesive unit when assembled. As such, the connection members 35, 36 may not be readily apparent to a potential thief when the connector 34 is engaged with the alarm module 18.

As noted above, the sensor 12 may be configured to utilize power from the item of merchandise 14 for performing one or more functions according to some embodiments. Thus, the sensor 12 may not require an internal power source for performing various security functions. In one example, the sensor 12 may be configured to toggle between transmitting and receiving power. For instance, the sensor 12 may utilize a battery as discussed above for performing one or more security functions. Additionally or alternatively, the sensor 12 may be configured to transmit power from an external power source to the item of merchandise 14, such as power provided from a charging device 20, display stand, base, or the like. For instance, the sensor 12 may simply pass power from the charging device 20 through to the item of merchandise 14 for charging the battery of the item of merchandise. In addition, the sensor 12 may be configured to receive power from the battery of the item of merchandise 14. The sensor 12 may utilize the power provided from the battery to perform one or more security functions (e.g., communicating with monitoring device 16 or other monitoring unit). Thus, unlike a conventional sensor that utilizes its own power source, the sensor 12 may be configured to toggle between transmitting and receiving power to an item of merchandise 14. In another example, the item of merchandise 14 may utilize USB "on-the-go" or like functionality for facilitating power transfer from the item of merchandise to and from the sensor. In some embodiments, the sensor 12 may include a capacitor to aid in the transition between a position where the item of merchandise 14 and/or the sensor are being charged to a position where the item of merchandise 14 and/or the sensor 12 are no longer being charged. Thus, a false alarm may be avoided in the event that power is lost momentarily when power to the sensor 12 is transitioned between power sources.

Figure 8:
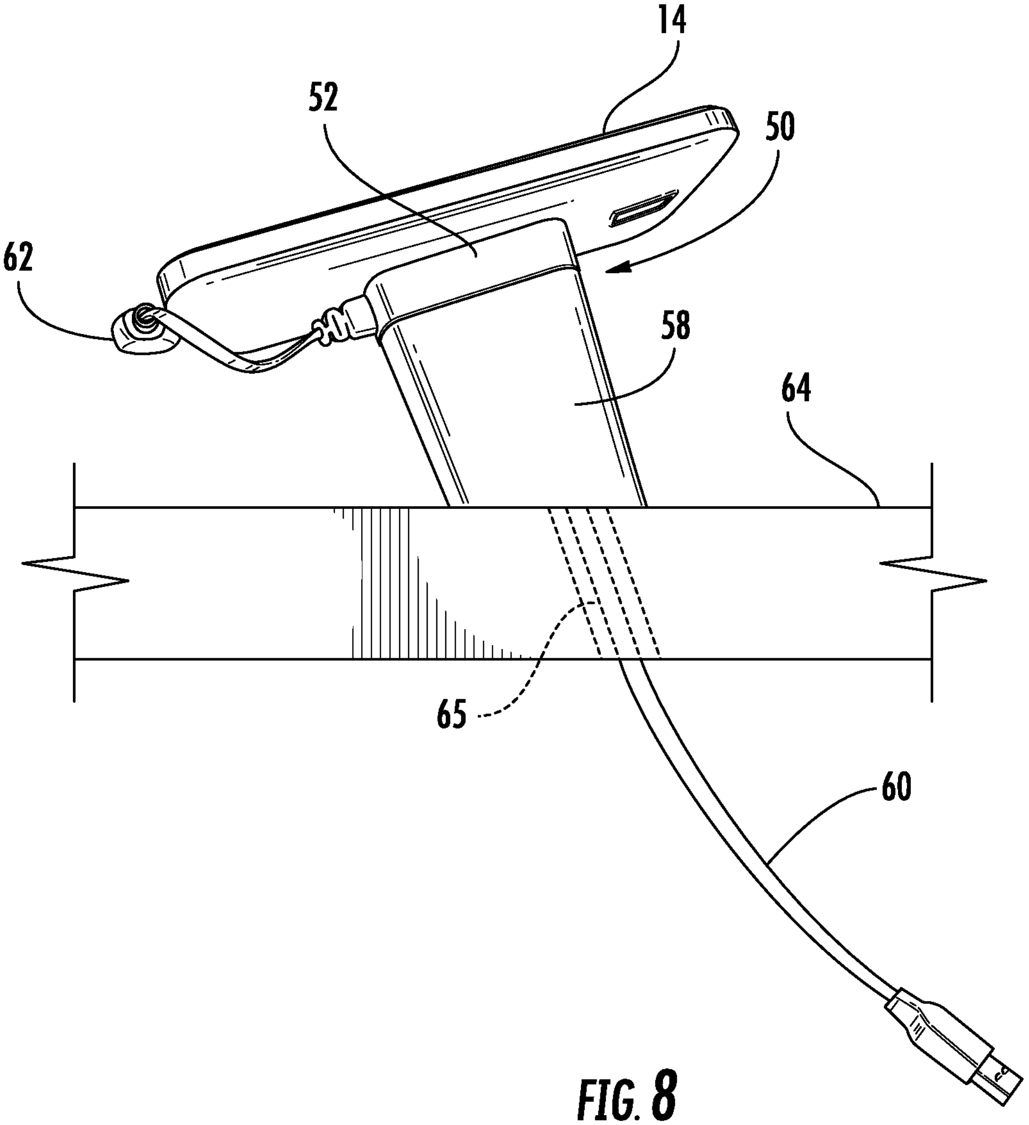
FIG. 8 is a side view of the security system shown in FIG. 7.
Figure 9:
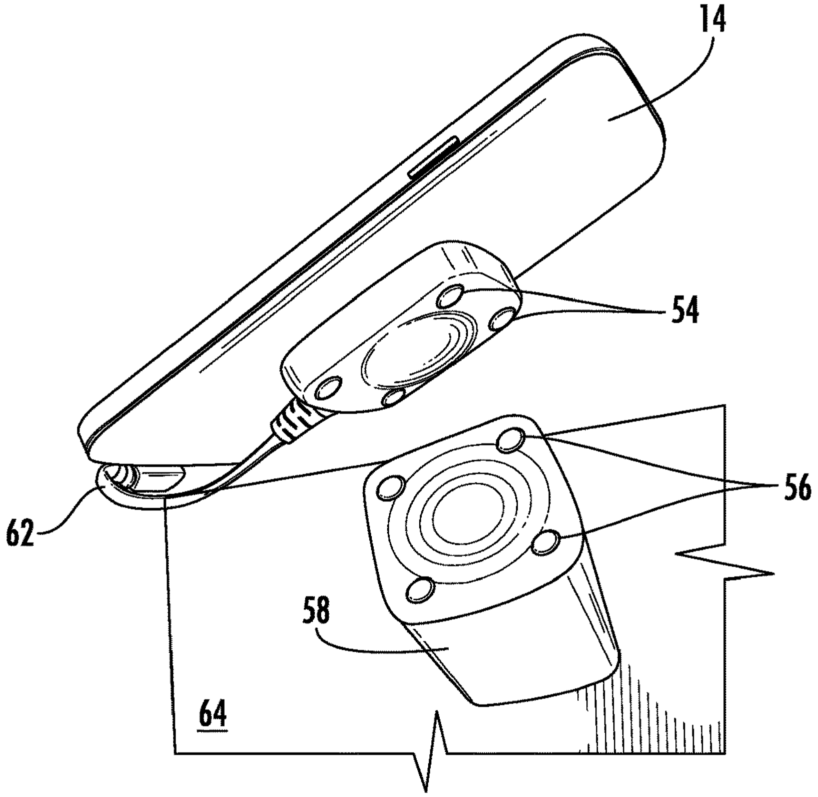
FIG. 9 is a perspective view illustrating the sensor and the item of merchandise being removed from the display stand of the security system shown in FIG. 7.
Figure 10:
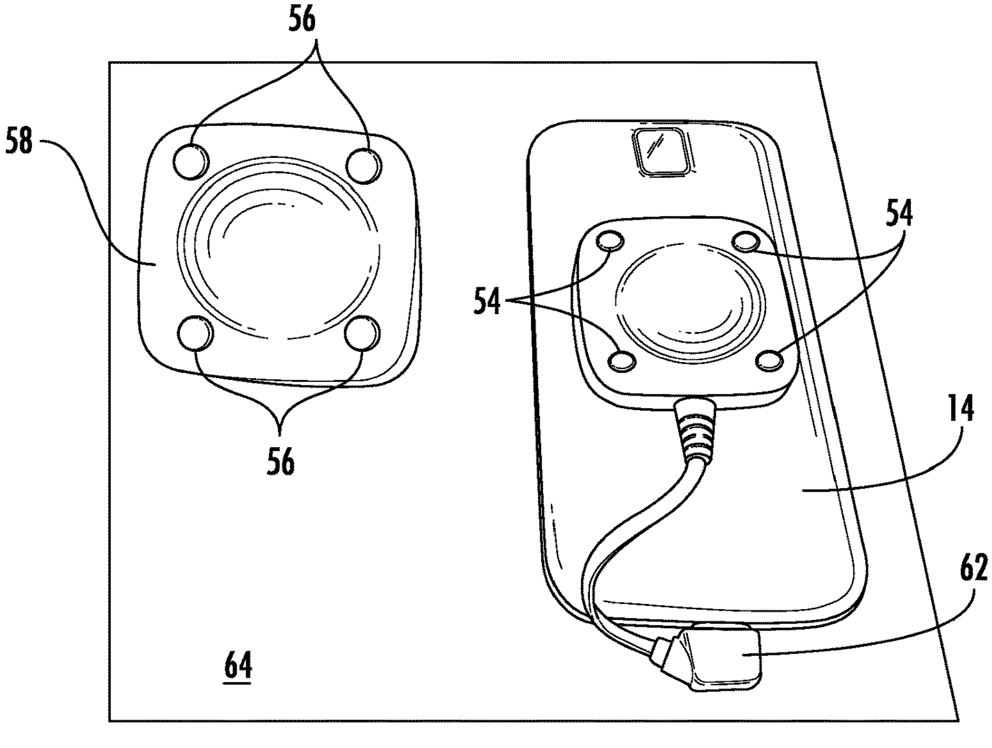
FIG. 10 is a plan view showing the sensor and the item of merchandise removed from the display stand of the security system shown in FIG. 7.

As discussed above, various means may be used to provide power to the sensor 12 and/or the item of merchandise 14, such as by contact charging. FIGS. 7-10 show an embodiment of a security system 50 in which the sensor 52 comprises one or more contacts 54 that are configured to align with one more contacts 56 on a display stand 58. When the contacts 54, 56 are in physical contact with one another, electrical power is able to be transmitted to the sensor 52 and the item of merchandise 14. When the sensor 12 is lifted off of the display stand 58, electrical power is no longer transmitted to the sensor 52 of the item of merchandise 14. A power cable 60 configured to be electrically connected to a power source may be electrically connected to the display stand 58. Thus, the item of merchandise 14 may be charged when the contacts 54, 56 are electrically connected with one another. As also discussed above, the sensor 52 in this embodiment may be configured to toggle between transmitting power to the item of merchandise 14 when the sensor 52 is supported on the display stand 58 and receiving power from the item of merchandise 14 when the sensor 52 is removed from the display stand 58. In this embodiment, a power adaptor cable and connector 62 may be configured to be electrically connected to an input port of the item of merchandise 14 at one end and to the sensor 52 at the other end. The connector 62 may be removably inserted within the input port of the item of merchandise 14, and should the connector 62 be removed in an unauthorized manner, the display stand 58 and/or sensor 52 may be configured to detect the removal and initiate or otherwise generate a security signal. In this embodiment, the sensor 52 may be attached to the rear of the item of merchandise 14, for example, by a pressure-sensitive adhesive. Furthermore, different power adapter cables having different connectors may be used for various items of merchandise that use different input ports. As noted above, the monitoring device 16 and the alarm module 18 may be integrated together as a single unit, if desired. FIGS. 7-10 show such an example where the display stand 58 includes charging, monitoring, and alarming functionality integrated together into a single unit. As such, the security system 50 may utilize a stand-alone display stand 58 that is configured to wirelessly communicate with the sensor 52 and/or the item of merchandise 14. In some cases, the item of merchandise 14 and the sensor 52 may be removably supported on the display stand 58 as shown in FIG. 9. Moreover, the display stand 58 may be configured to be mounted to a support, fixture, or the like, such as a display surface 64, whereby the power cable 60 may extend through an opening 65, as shown in FIG. 8.

Figure 11:
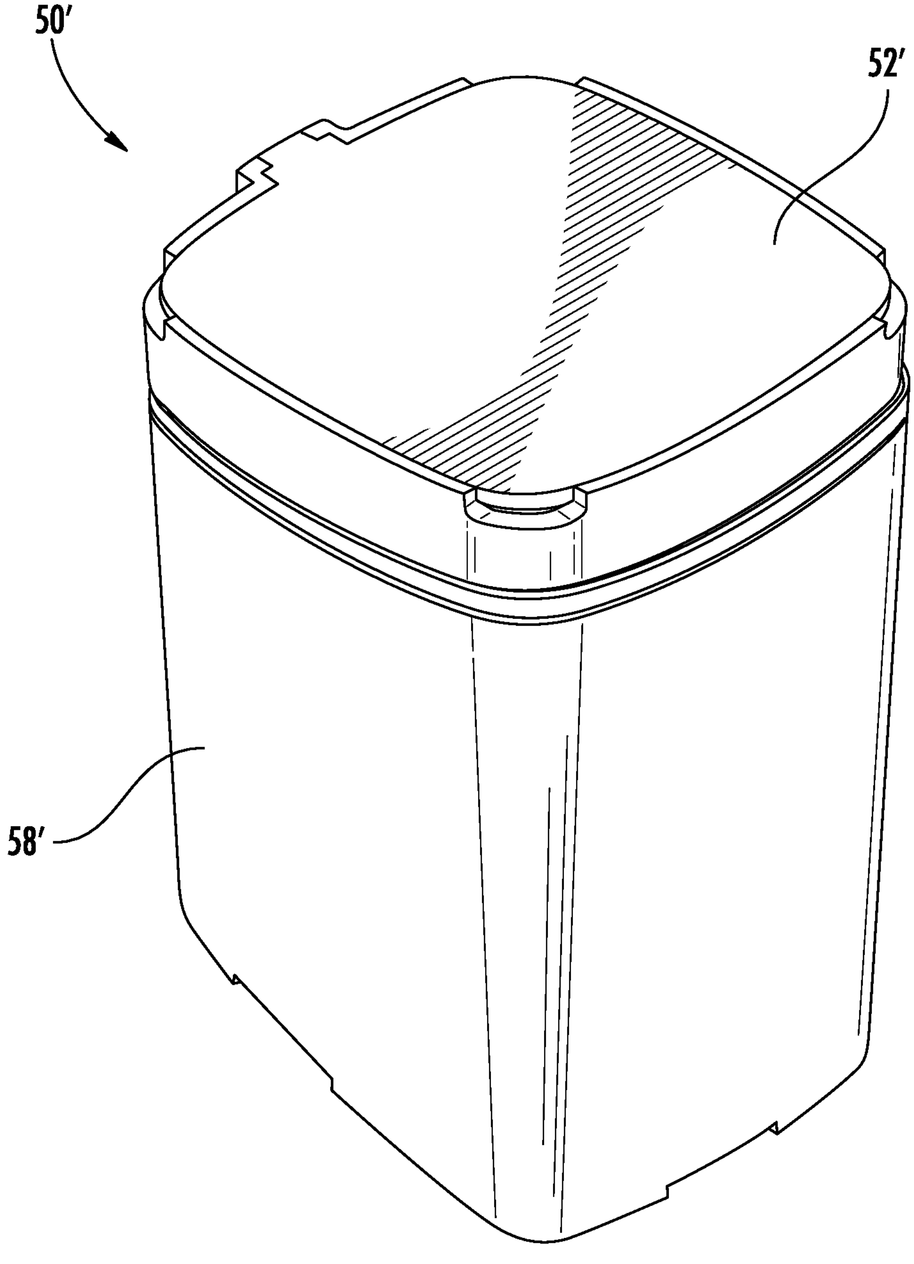
FIG. 11 is a perspective view of a security system configured for securing an item of merchandise from theft in a retail display according to another embodiment of the invention with the item of merchandise removed for purposes of clarity.
Figure 12:
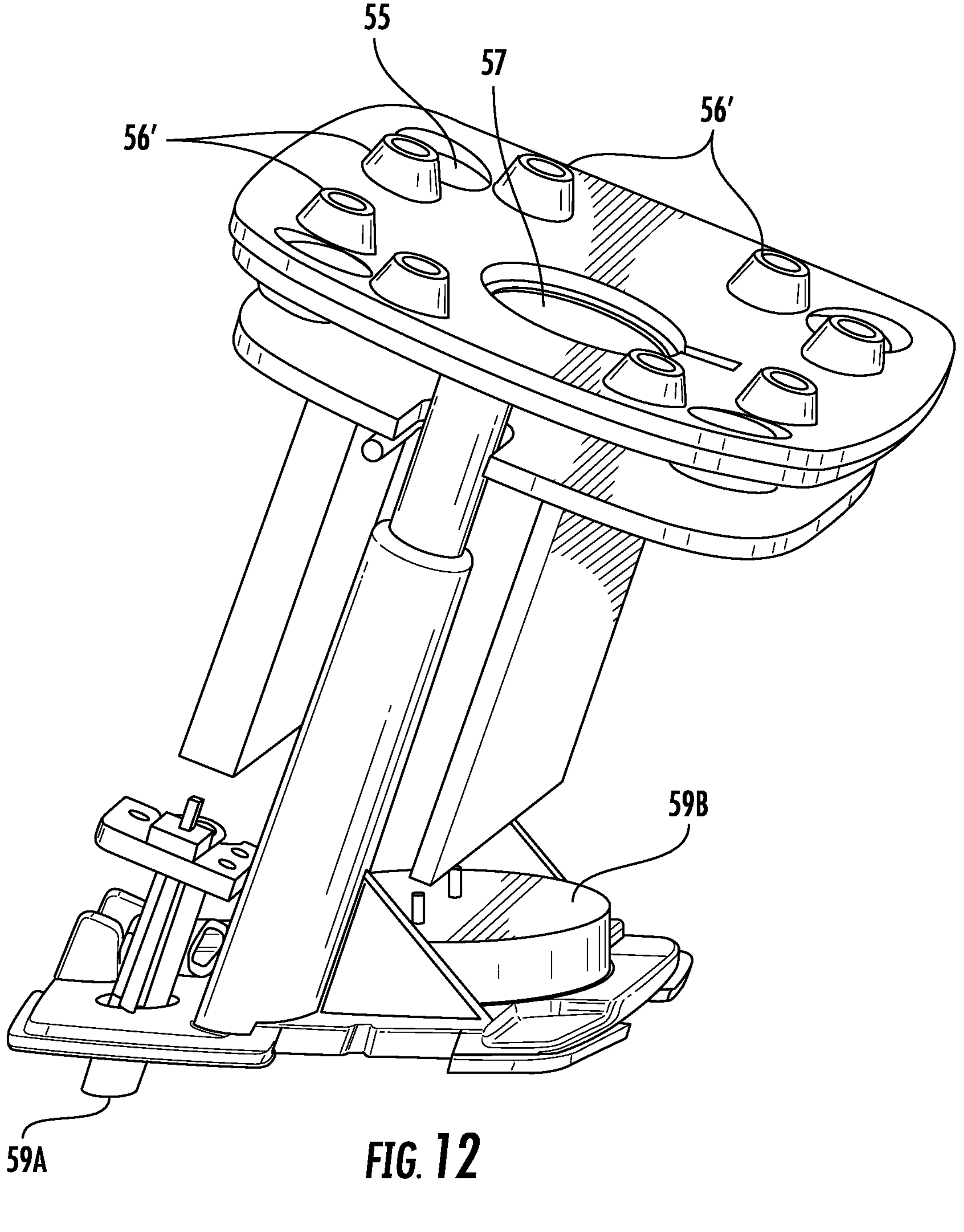
FIG. 12 is a perspective view of the display stand of the security system shown in FIG. 11 with an outer cover of the display stand removed for purposes of clarity.
Figure 13:
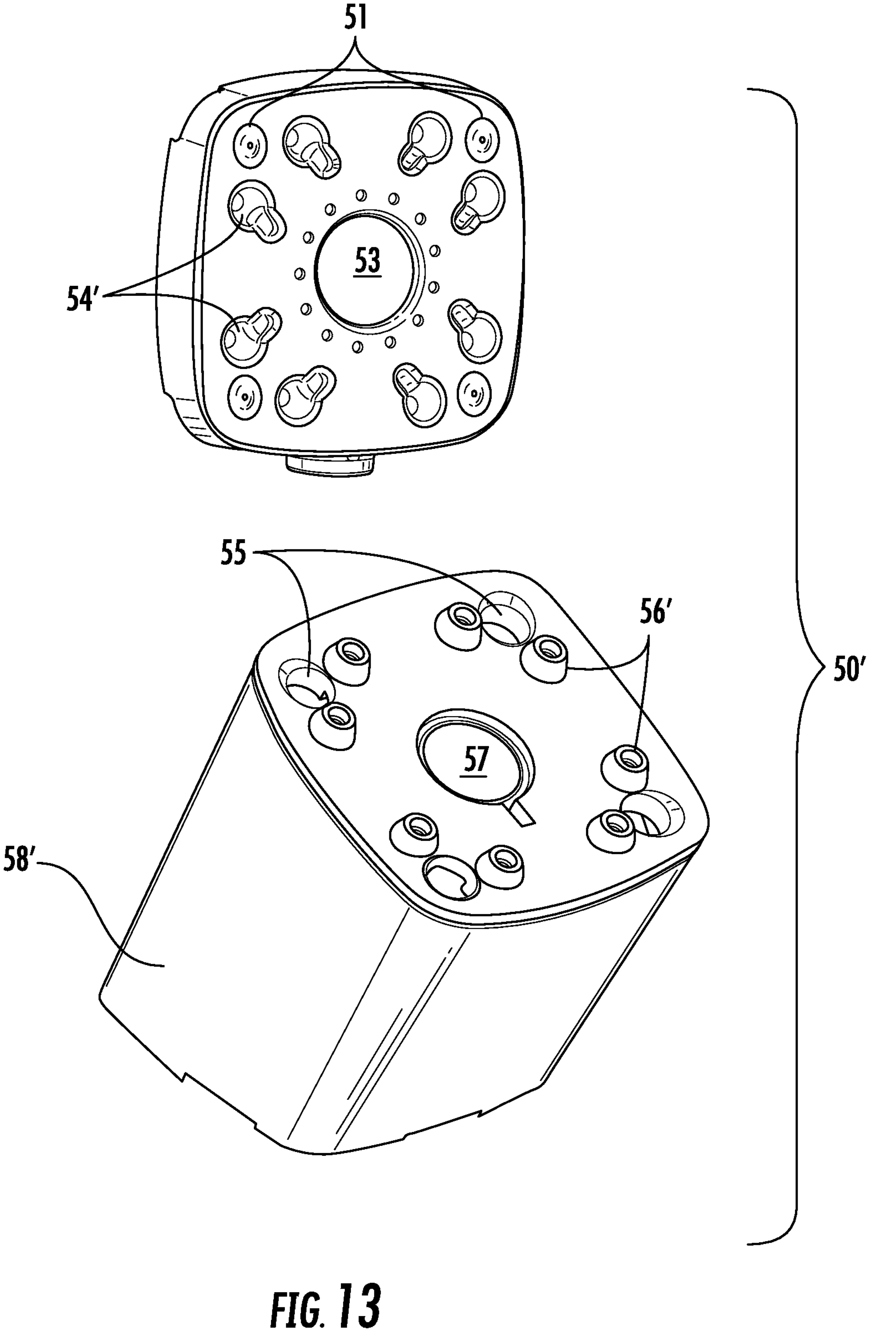
FIG. 13 is an exploded perspective view of the display stand and the sensor of the security system shown in FIG. 11 with the item of merchandise removed for purposes of clarity.

FIGS. 11-13 show a security system 50' configured for securing an item of merchandise from theft in a retail display according to another embodiment of the invention. The security system 50' is similar in operation to the security system 50 previously described. As such, only the relevant differences between the embodiment of the security system 50' and the embodiment of the security system 50 will be described herein. FIG. 11 shows the security system 50' may include a display stand (also referred to herein as base) 58' and a sensor 52' configured to be removably supported on the display stand. As previously described, the display stand

58' includes charging, monitoring and alarming functionality integrated into a single unit and may be configured to be mounted on a support, fixture, display surface, or the like. As such, the sensor 52' includes contacts 54' and the base 58' includes contact 56' so that electrical power may be transferred to the sensor and/or the item of merchandise when the contacts 54', 56' are in physical contact with one another. Sensor 52' may further include one or more projections 51 (see, FIG. 13) and base 58' may further include one or more recesses 55 (see, FIG. 12 and FIG. 13) to facilitate alignment of the contacts 54' provided on the sensor with the contacts 56' provided on the base. In one embodiment, sensor 52' and base 58' communicate via Infrared (IR) wireless communications. As such, the sensor 52' may be provided with an IR port 53 and the base 58' may be provided with a corresponding IR port 57 to facilitate IR wireless communications between the sensor and the base. However, other wireless communications, such as Bluetooth, BLE, NFC, RF, wireless charging, etc. may be utilized in place of, or in addition to, IR wireless communications.

Regardless, the base 58' functions as a standalone display stand that communicates wirelessly with the sensor 52' and/or an attached item of merchandise. Wireless communication occurs when the sensor 52' is proximate to (e.g., "near field") or placed on the base 58'. As previously described, the wireless communications may be utilized to initially identify the sensor for pairing the sensor to the particular base. The pairing may include, for instance, associating a specific identifier of the base 58' and/or the sensor 52' with one another. In some embodiments, once a sensor 52' is paired with a specific base 58', the sensor cannot be paired with another base without first disarming the sensor and/or the base. Should a sensor 52' be placed on a wrong base 58', the sensor and/or base may be configured to generate an audible and/or visible signal to indicate that the sensor has been placed on the wrong base. The wireless communications may also be utilized to indicate when the base 58' should begin contact charging with the sensor 52' and/or the attached item of merchandise. A slight electrical current may be supplied, via contact or wireless communications, prior to pairing the sensor 52' with the base 58' in order to activate, or "wake up," the sensor and initiate IR wireless communications with the base 58'. In one embodiment, the IR port 53 of the sensor 52' and the IR port 57 of the base 58' are configured for transmitting and receiving the IR wireless communications. The same IR ports 53, 57 utilized for wireless communications between the sensor 52' and the base 58' may also be utilized for communications with a security key, as discussed above. The security key may communicate wirelessly via the IR ports 53, 57 to arm and/or disarm an alarm provided on either the sensor 52' or the base 58', or both. The security key may arm and/or disarm arm the sensor 52' and/or base 58' independently or in cooperation with one another. For example, disarming the sensor 52' with a security key may also disarm the base '58'. However, the security key may be required to silence or disarm each of the sensor 52' and the base 58' in some instances. The wireless communications between the sensor 52' and the base 58' allow for a lower maintenance security system 50' and increased flexibility, as well as anonymity given that any sensor may be placed on any desired display stand or base without the need for intervention, for example by an authorized sales person. If desired, the base 58' may also include a proximity mechanism (e.g., a pressure or plunger switch) 59A that is operable for detecting if the base has been removed from a fixture, support, display surface, or the like, and a piezoelectric alarm 59B for generating a security signal when the display stand has been tampered with or removed.

In some embodiments, the item of merchandise may be configured to determine its location relative to the security system using positioning functionality, which may be referred to as "inertial navigation" or "trusted positioning." Thus, the item of merchandise may utilize various components carried thereby to determine a location of the item of merchandise. The location information determined by the item of merchandise may be used independently to determine the distance between the item of merchandise and a "home" position, for example, a display fixture, display stand, alarm module, etc. Alternatively, the item of merchandise may be used in conjunction with communications between the item of merchandise and a monitoring device, or between a sensor and a monitoring device. According to one embodiment, trusted positioning may be implemented using similar techniques as that described in U.S. Patent Publication No. 2012/0293330, entitled Systems and Methods for Protecting Retail Display Merchandise From Theft, the content of which is incorporated by reference herein in its entirety.

In some embodiments, the security system includes an inertial navigation system (INS) as a self-contained "add-on" security module that is affixed to, or otherwise integrated with, an item of merchandise, for example, a retail display item of merchandise being displayed for sale in a display area of a retail store. In another embodiment, an item of merchandise may include a software application for "smart" electronic merchandise including inertial navigation system (INS) functionality that is capable of executing a third-party software application. In this manner, the security system leverages the sensors, controller, audio components and capabilities of the item of merchandise, in particular, the host "smart" consumer electronics device. As will be appreciated by those skilled in the art, the term "smart" consumer electronics device as used herein refers to any device that is capable of executing a software application, for example, a cellular telephone, e-Reader, I-Pad, I-Pod, Tablet computer, tablet device, laptop computer, notebook computer, digital camera, SLR, media (audio/video) player, or other electronics device including processing capability and an executable memory.

As used herein, the term "inertial navigation system (INS)" means a navigation aid that uses a computer, motion sensors (e.g. accelerometers) and rotation sensors (e.g. gyroscopes) for processing motion without external references. The inertial navigation system (INS) advantageously determines, for example via dead reckoning, the position, orientation, and velocity (direction and speed of movement) of a moving object without reliance on external references. Indeed, one particular embodiment of the present invention is a security system including an inertial navigation system (INS) in the form of a software application and associated hardware, or a security system configured for operation with such an item of merchandise, that does not rely on an external reference for determining the position of the item of merchandise relative to a predetermined "home" position.

Figure 14:
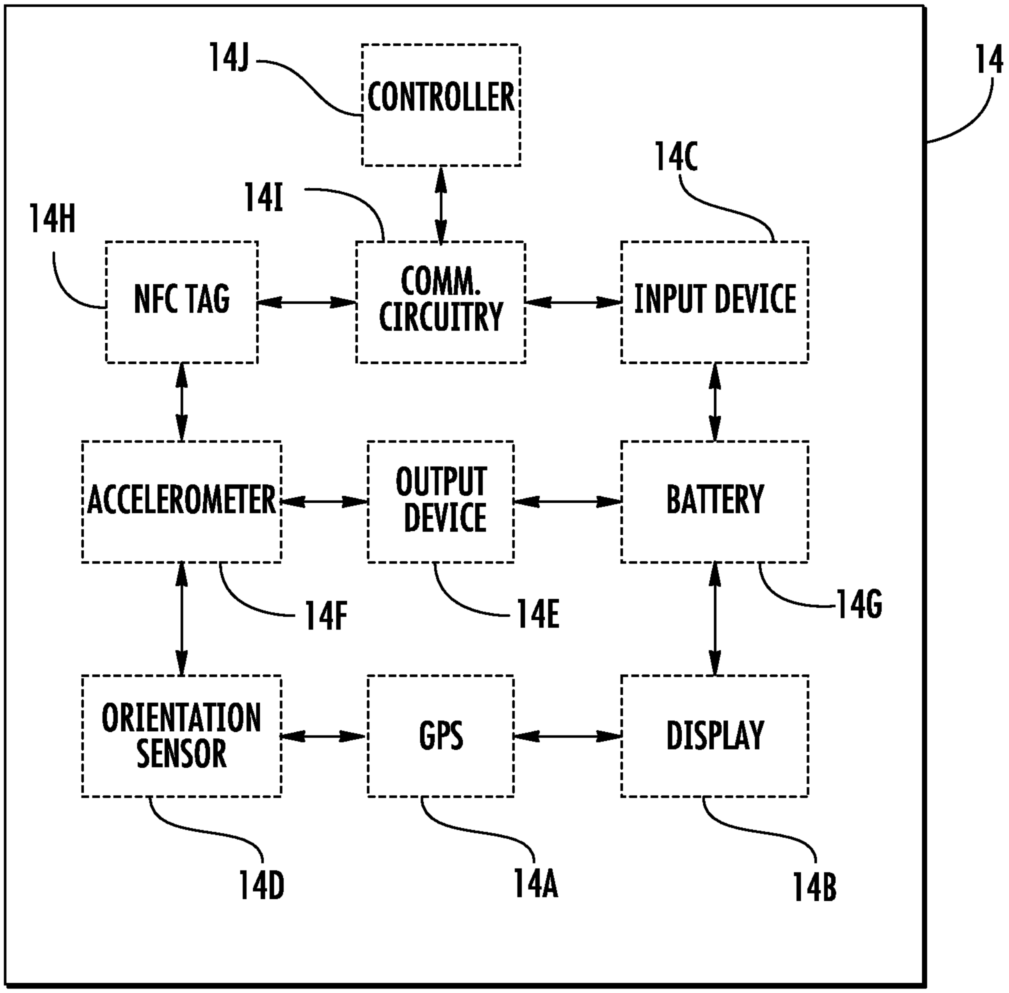
FIG. 14 is a schematic plan view of an item of merchandise according to one embodiment of the invention.

In one embodiment of an item of merchandise 14 according to the invention illustrated in FIG. 14, the merchandise includes a satellite positioning signal receiver, for example, a Global Positioning System (GPS) satellite receiver 14A, as is known in the art. The item of merchandise 14 may further include a display 14B, and one or more input devices 14C (e.g., a keypad) for accepting user inputs, as will also be appreciated by those skilled in the art. Input device(s) 14C may also include keys, buttons or the like, or may be embodied by a touch screen, as is known in the art. The item of merchandise 14 may further include an orientation sensor 14D. The orientation sensor 14D may be a gyroscope, for example, and more particularly, may be a 3-axis gyroscope. The orientation sensor 14D may also be embodied by a digital compass, for example, as will be appreciated by those skilled in the art. In one embodiment, the item of merchandise 14 also includes an output device 14E. In some embodiments, the output device 14E is an audio output transducer, or speaker. The output device 14E may be another type of audio output device and other output devices may also be used, for example, a haptic output device or a visual output device, alone or in combination with an audio output device. In further embodiments, the item of merchandise 14 (e.g., portable electronic device) also includes an accelerometer 14F. The accelerometer 14F may be a multi-axis accelerometer, or alternatively, the item of merchandise 14 may include multiple directional accelerometers. The item of merchandise 14 may also include a battery 14G, which may comprise, for example, nickel-metal hydride or lithium ion battery cells. In some embodiments, the item of merchandise 14 may further include a proximity mechanism (e.g., a pressure or plunger switch) that is operable for detecting if the item of merchandise has been tampered with, such as when a battery cover has been removed. In some instances, the proximity mechanism may utilize near field communication (NFC) to sense removal of a component of the item of merchandise, and thus, the item of merchandise 14 may also include an NFC tag 14H configured for facilitating wireless communications between the item of merchandise and a removable component of the item of merchandise and/or a display fixture, display stand, alarm module, or the like. As such, a security signal may be generated upon removal of the component, or the consumer may be allowed a predetermined period of time to replace the removed component prior to generating a security signal.

Figure 15:
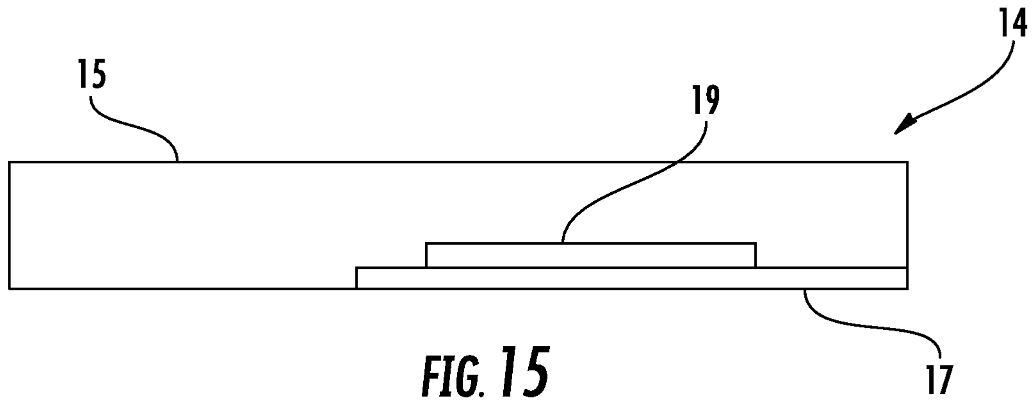
FIG. 15 is a schematic side view of an electronic item of merchandise according to one embodiment of the invention illustrating a removable battery cover and battery.

In one embodiment illustrated schematically in FIG. 15, the removal of the battery cover 17 may also remove another component 19 of the item of merchandise. For example, removal of the battery cover 17 may also remove a component 19, such as a battery, a SIM card, an SD card, or the like, of the of the item of merchandise 14. The battery cover 17 could be operably engaged with the other component 19, such as with a double-sided adhesive, such that upon removal of the battery cover 17, the component 19 is also removed. Where the component 19 is a battery (e.g., battery 14G), the monitoring device 16 may be configured to detect the loss in power of the item of merchandise 14 and to initiate a security signal. The item of merchandise 14 may also include a housing 15 for containing any desired component of the item of merchandise (see, e.g., FIG. 14), and the battery cover 17 may be removably secured to the housing. Therefore, unlike some conventional methods for making the battery and/or other removable components more difficult to remove, embodiments of the present invention facilitate easier removable of a removable component to detect a security event.

In one embodiment, the item of merchandise includes communications circuitry 141, and in particular, wireless communication circuitry. The item of merchandise 14 may also include a controller 14J operably coupled to the wireless communications circuitry 141, the accelerometer 14F, the orientation sensor 14D, and/or the output device 14B. The controller 14J may be configured to cooperate with the wireless communications circuitry 141 to coordinate and control operations of the item of merchandise 14, namely wireless communications functions and capabilities thereof. Operations may include mobile voice and data operations, including email and Internet data, for example. In additional embodiments, the item of merchandise 14 may include near field communication (NFC) functionality and be configured to communicate via the NFC tag 14H with a security key or other security device having NFC functionality to arm and/or disarm a security signal, or to lock and/or unlock the item of merchandise.

In some embodiments, the controller 14J is configured to cooperate with the orientation sensor 14D to determine a reference direction of the item of merchandise 14. For example, when the item of merchandise 14 is held by a potential purchaser in an operational position with the display 14B and input device(s) 14C facing the customer, the orientation sensor may cooperate with the controller 14J to determine the direction that the customer and the item of merchandise are facing, for example, North. The controller 14J may also cooperate with the accelerometer 14F to measure and monitor an acceleration of the item of merchandise.

Based upon the orientation and measured accelerations of the item of merchandise 14, as well as the elapsed time of any movements of the merchandise, the controller 14J may be configured to determine a distance from a given location, such as a designated retail display “home” position. The “home” position may, for example, be established by the item of merchandise 14 being in contact with, or in close proximity to, a display position, surface, stand, holder, platform, charging device, or the like. More particularly, the controller 14J may be programmed directly, for example, via the input device(s) 14C, or alternatively, may be programmed indirectly by an external system or device, so that the location of the display surface is the “home” position of the item of merchandise. The controller 14J may determine the distance the item of merchandise 14 is moved from the “home” position, when the item of merchandise is removed from the “home” position by a customer considering whether to purchase the merchandise.

It should be noted that the “home” position need not be the same location each time. Additionally, or alternatively, there may be more than one “home” position. For example a “home” position may be a display stand, a charging device or station (e.g., charging station 20), or any number of a plurality of “power hotspots,” such as inductive power transfer charging stations. Alternatively, or additionally, the “home” position may be a location at which the item of merchandise 14 remains motionless for a period of time and the wireless communications circuitry 141 indicates a minimum threshold power signal. In other words, a “home” position may be established when the electronic item of merchandise 14 is motionless and charging for a predetermined period of time. Alternatively, or in conjunction with establishing one or more “home” positions, the controller 14J may use one or more motion sensors (e.g., accelerometer 14F, orientation sensor 14D, etc.) and motion processing algorithms to establish (i.e. map) a “safe” zone (also boundary, perimeter or area) with or without reference to one or more “home” positions. The controller 14J can then determine, based on subsequent motion processing, whether an item of merchandise 14 is moved from a location within the “safe” zone to a location outside or beyond the established “safe” zone.

In some embodiments, the controller 14J is configured to determine the distance traveled from the “home” position based upon inertial navigation system (INS) techniques, for example, dead reckoning, as will be appreciated by those skilled in the art. As such, no external references, for example, a GPS determined position or RF communication, are required to determine the distance traveled by the item of merchandise 14 from the "home" position. As a result, a security system configured for operation with an item of merchandise in accordance with this embodiment of the invention may be advantageous for use in an indoor environment, for example, a display area of a retail store, where a GPS position cannot always be determined and where RF communications can be obstructed.

The item of merchandise 14 may further include a memory, for example, as a subcomponent of controller 14J, for storing computer-executable instructions and data for processing. The controller 14J may cooperate with the computer-executable instructions in the memory, for example, an algorithm embodied in a software application, to perform the functions described herein. As will be appreciated by those skilled in the art, the controller 14J may be embodied as a hardware component or as a combination of hardware and application software.

Figure 16:
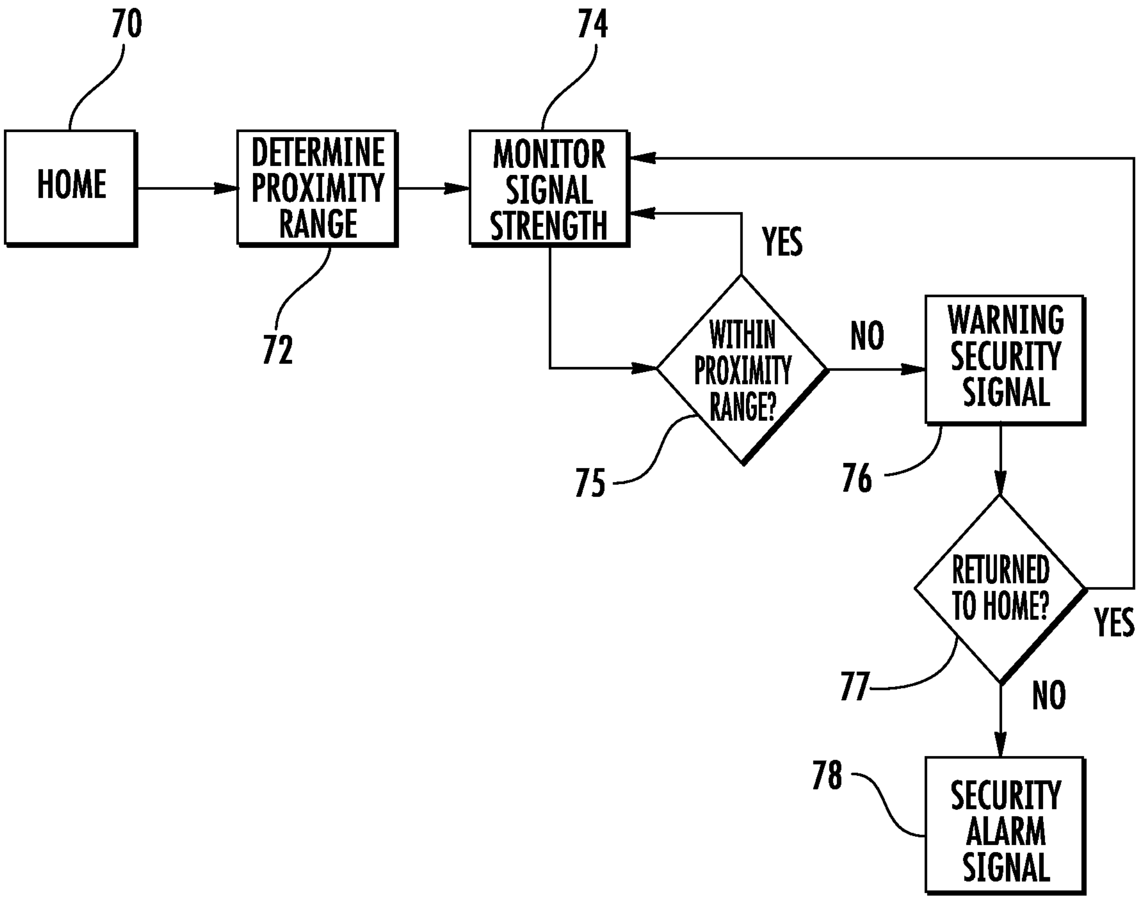
FIG. 16 is a flowchart of a method for securing an item of merchandise from theft in a retail display according to one embodiment of the invention.

As discussed above, the monitoring component 16, 58, 58' (e.g., monitoring device or display stand) and the corresponding sensor 12, 52, 52' may be configured to wirelessly communicate with one another. In some embodiments, the signal strength of communication between the monitoring component 16, 58, 58' and the corresponding sensor 12, 52, 52' may be used to provide security (e.g., via RSSI). One embodiment of a method utilizing signal strength is shown in FIG. 16. For example, a consumer may be permitted to examine an item of merchandise 14 within a predetermined distance from a "home" position indicated in FIG. 16 by reference character 70, such as the monitoring device 16, alarm module 18, charging device 20, display stand 58, or base 58' previously described. As noted above, the home position 70 may correspond to a position where there is no motion of the item of merchandise 14 and the sensor 12, 52, 52' for at least a predetermined time, and/or where an item of merchandise is being charged. Should the signal strength weaken or cease, a security signal may be generated. In some embodiments, the communication between the monitoring component 16, 58, 58' and the sensor 12, 52, 52' may be initiated when a consumer interacts with the item of merchandise 14. For example, communication may begin when a consumer picks up the item of merchandise 14. The monitoring component 16, 58, 58' may detect when the sensor 12, 52, 52' and the item of merchandise 14 begins moving and/or when charging ceases. Upon the item of merchandise 14 being picked up, the monitoring component 16, 58, 58' may be configured to detect this interaction and thereafter determine a proximity range, indicated in FIG. 16 by reference character 72, that is indicative of the strength of the communication signal between the sensor 12, 52, 52' and the monitoring component 16, 58, 58'. For instance, the determined proximity range 72 may be a range between the home position 70 and a maximum allowable position from the home position.

The determined proximity range 72 could be based on any number of factors, such as the environment, the position of the item of merchandise 14 or the consumer when the merchandise is initially picked up, the size of the consumer's hand, etc. For example, the monitoring component 16, 58, 58' may create a range that is defined by upper and lower bounds or set points that are used to determine whether the consumer, and thus, the item of merchandise 14, is within an acceptable proximity to the monitoring component. The proximity range 72 may be a range between an established home position 70 and a position that would initiate a security signal. The proximity range 72 may be determined dynamically, such that the home position 70 and a maximum position from the home position are determined dynamically and may be unique for each item of merchandise 14. The proximity range 72 may utilize the home position 70 and other data when a user initially picks up the item of merchandise 14 (e.g., within 1-2 seconds). This data could be used to determine the maximum value of the proximity range 72. For example, a user with larger hands may hinder the wireless communication more than a user with smaller hands, and thus the user with the larger hands may have a greater proximity range 72.

Alternatively, the proximity range 72 need not be determined based on communications between the monitoring component 16, 58, 58' and the item of merchandise 14 and/or sensor 12, 52, 52'. For example, the maximum value of the proximity range 72 may be defined by the retailer and manually input to the security system, such as when the sensor 52, 52' is first positioned on the display stand 58, 58'. The retailer may establish a maximum value of the proximity range to 2 feet, 3 feet, 5 feet, or any desired distance from the home position that is within the field of communications. Thus, the proximity range may be any distance range between zero and some selected maximum allowable distance. In some cases, the retailer is able to select a desired range from a plurality of ranges. Furthermore, the proximity range 72 may be based on various assumptions, such as an assumption that the item of merchandise 14 is near to the home position 70 at a particular time, or that the item of merchandise is moving, but is not indicative of a security event.

In another embodiment, a calibration routine may be used to initially set the proximity range or other predetermined range. In this example, the sensor 12, 52, 52' is configured to communicate with the monitoring component 16, 58, 58' to set a proximity range. In particular, a user may activate a security key, similar to that described above, to communicate with the monitoring component 16, 58, 58' to initiate the calibration routine (e.g., a predetermined number of key button presses). An audible and/or a visible signal may be emitted to indicate the calibration routine has been initiated. Following the security key activation, the user may be provided a predetermined period of time to set the proximity range (e.g., about 30 seconds to 1 minute). In this case, the user may move the sensor 12, 52, 52' to a desired distance from the monitoring component 16, 58, 58' and activate the security key to communicate with the sensor. Communication between the key and the sensor 12, 52, 52' sets a flag in a message to be transmitted to the monitoring component 16, 58, 58' indicating that the proximity range is to be determined. The monitoring component 16, 58, 58' receives the flagged message from the sensor 12, 52, 52' and calculates the distance. Thus, the monitoring component 16, 58, 58' and the sensor 12, 52, 52' may be configured to exchange data and/or messages containing various information. Following the predetermined period of time, the proximity range is set and any movement of the sensor 12, 52, 52' relative to the monitoring component 16, 58, 58' will be based on the proximity range set during the calibration routine. Thus, the calibration routine allows for added flexibility in setting the proximity range and provides the user with the ability to dynamically set the proximity range based on his or her own preferences.

In one embodiment, the proximity range 72 may be determined by the signal strength between the monitoring component 16, 58, 58' and the sensor 12, 52, 52', and the monitoring component may be configured to monitor the signal strength therebetween, as indicated in FIG. 16 by reference character 74. For instance, the monitoring component 16, 58, 58' may be configured to continuously monitor the signal strength or periodically monitor the signal strength at a predetermined frequency (e.g., 10-100 Hz). The monitoring component 16, 58, 58' may be configured to determine whether the item of merchandise 14 and the sensor 12, 52, 52' are within the determined proximity range 72, as indicated in FIG. 16 by reference character 75, and to initiate the generation of security signals by communicating with the alarm component 18, 58, 58' (e.g., alarm module or display stand) when the proximity range is exceeded. The alarm component 18, 58, 58' may in turn be configured to generate a security signal when the distance between the monitoring component 16, 58, 58' and the sensor 12, 52, 52' is not within the proximity range 72. For example, where the item of merchandise has moved beyond a predetermined allowed distance (as indicated by signal strength), the alarm component 18, 58, 58' may be configured to generate a first warning security signal, as indicated in FIG. 16 by reference character 76. The sensor 12, 52, 52' and/or the item of merchandise 14 could alternatively or additionally initiate or otherwise generate such a warning signal. The monitoring component 16, 58, 58' may be configured to then determine whether the item of merchandise 14 and the sensor 12, 52, 52' are moved to a position within the determined proximity range 72, such as the home position 70, as indicated in FIG. 16 by reference character 77. Should the item of merchandise 14 not be returned to the home position 70 or to a position within the determined proximity range 72, the alarm component 18, 58, 58' may generate a full security alarm signal, as indicated in FIG. 16 by reference character 78. Additionally or alternatively, the item of merchandise 14 and/or sensor 12, 52, 52' may be configured to initiate or otherwise generate a full security alarm signal. Should a valid key (e.g., a valid NFC key) be presented to the alarm component 18, 58, 58' or to the item of merchandise 14 and/or sensor 12, 52, 52', the security alarm signal may be silenced.

In some embodiments, the monitoring component 16, 58, 58' and the sensor 12, 52, 52' are not required to be paired to one another. For example, the sensor 12, 52, 52' may be configured to transmit identifying information when the item of merchandise 14 and sensor are separated from the monitoring component 16, 58, 58', and the consumer interacts with the item of merchandise. The identifying information may be the same or similar information typically transmitted by a Bluetooth enabled device. The sensor 12, 52, 52' may be configured to transmit the identifying information to the monitoring component 16, 58, 58' at a predetermined frequency that is significantly higher than conventional Bluetooth enabled devices. For example, the transmission frequency may be about 20 Hz. In some cases, the monitoring component 16, 58, 58' may be pre-programmed with the identification of the sensor 12, 52, 52' and/or the item of merchandise 14 so that the monitoring component may then detect the RSSI of the desired sensor and/or item of merchandise. In addition, the monitoring component 16, 58, 58' may be configured to filter specific RSSI values or otherwise smooth the received values into meaningful data. In this regard, a filtering algorithm may be employed for smoothing the data.

Figure 17:
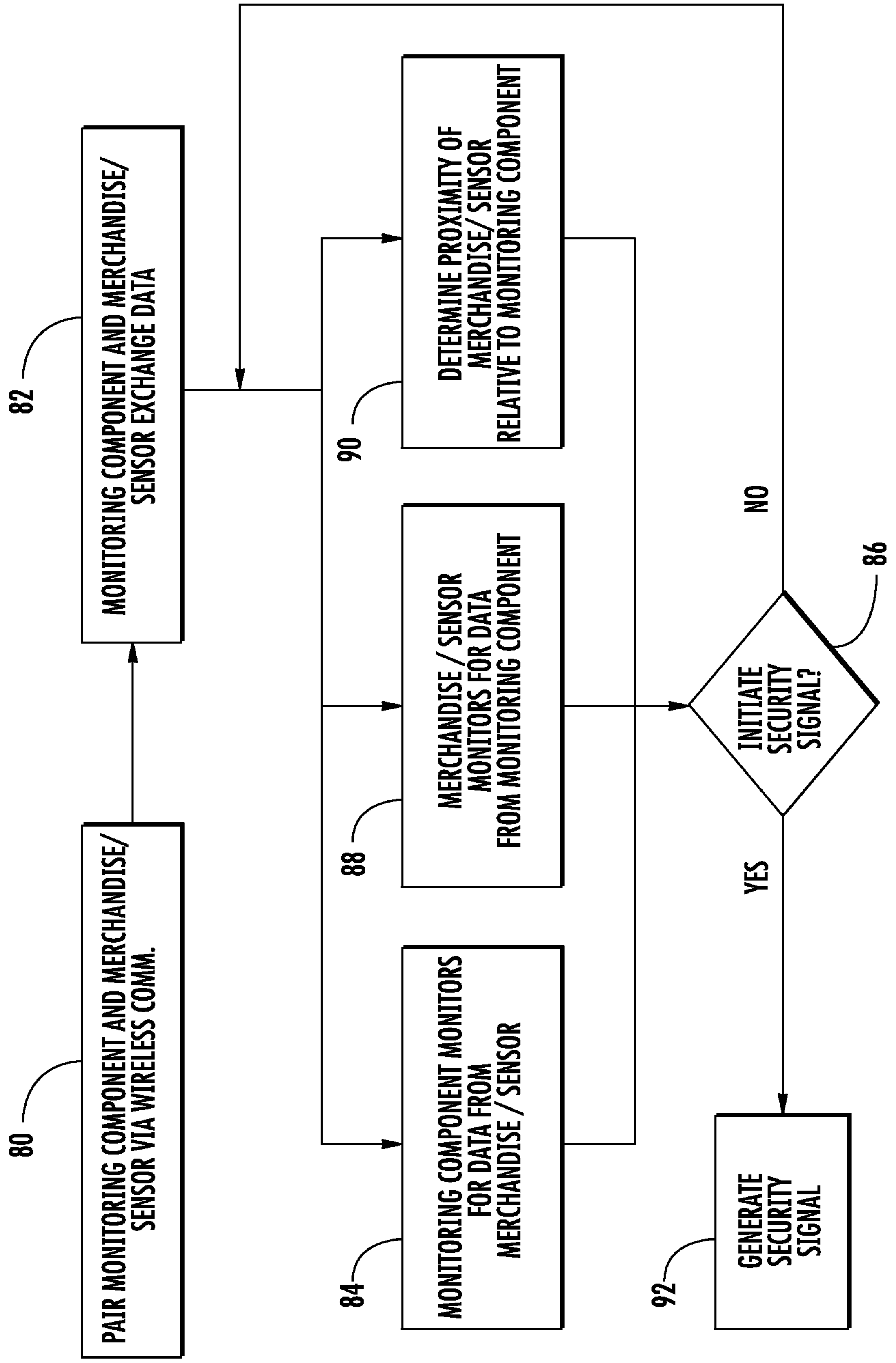
FIG. 17 is a flowchart of a method for securing an item of merchandise from theft in a retail display according to one embodiment of the invention.

In another embodiment of a method according to the invention illustrated in FIG. 17, the monitoring component 16, 58, 58' (i.e., watchtower or "WT") and the item of merchandise 14 (e.g., a cellular phone) and/or sensor 12, 52, 52' are paired (e.g., via Bluetooth communication) and remain in wireless communication with one another, as indicated in FIG. 17 by reference character 80. The monitoring component 16, 58, 58' and the item of merchandise 14 and/or sensor 12, 52, 52' may be configured to exchange data or "heartbeat" ("HB") messages, as indicated in FIG. 17 by reference character 82, at a predetermined frequency or in predetermined increments of time. For example, the data may include, for example, a message indicating that a security signal be generated. The HB messages may include any desired information, such as the identification of the monitoring component 16, 58, 58' or item of merchandise 14, the state of the monitoring component or the item of merchandise (e.g., armed, security breach, alarming, etc.), or a previous signal strength value. The monitoring component 16, 58, 58' (i.e., WT) may be configured to monitor for data transmitted from the sensor 12, 52, 52' and/or the item of merchandise 14 (i.e., cellular phone), as indicated in FIG. 17 by reference character 84, and to determine whether to initiate a security signal, as indicated in FIG. 17 by reference character 86. Likewise, the sensor 12, 52, 52' and/or the item of merchandise 14 may be configured to monitor for data transmitted from the monitoring component 16, 58, 58', as indicated in FIG. 17 by reference character 88. The monitoring component 16, 58, 58', the sensor 12, 52, 52', and/or the item of merchandise 14 may be configured to monitor for data in predetermined increments of time (e.g., 150 msec). In addition, the proximity of the item of merchandise 14 may be determined relative to the monitoring component 16, 58, 58' based on signal strength between the monitoring component and the sensor 12, 52, 52' and/or the item of merchandise 14, as indicated in FIG. 17 by reference character 90. The signal strength may be used to determine the proximity therebetween and be used in conjunction with the exchange of data to secure the item of merchandise 14 from theft. In this example, the monitoring component 16, 58, 58' may be configured to monitor the signal strength with the item of merchandise 14 based on RSSI. However, the monitoring component 16, 58, 58' may alternatively be configured to monitor the signal strength with the item of merchandise 14 based on ultra-wideband "time-of-flight." Depending on the message delivered and/or the signal strength, the monitoring component 16, 58, 58' or the sensor 12, 52, 52' and/or the item of merchandise 14 can initiate or otherwise generate a security signal, as indicated in FIG. 17 by reference character 92. For example, the monitoring component 16, 58, 58' may communicate with the alarm component 18, 58, 58' to generate a security signal (e.g., using a piezoelectric alarm or LED). Similarly, the item of merchandise 14 may be configured to act on the message delivered by the monitoring component 16, 58, 58' and/or the signal strength therebetween, such as by generating a warning security signal, an alarming security signal, or a thank you signal. In addition, the sensor 12, 52, 52' may include an output device (e.g., a piezoelectric alarm), such as those discussed above in conjunction with the alarm component 18, 58, 58' or item of merchandise 14, for generating a security signal, such as in response to removal of the sensor from the item of merchandise 14. In some embodiments, the sensor 12, 52, 52' may initiate a security signal when a security event is detected by the sensor and/or monitoring component 16, 58, 58' and may communicate with an output device for generating the security signal.

In one embodiment, the item of merchandise 14, sensor 12, 52, 52', and/or the monitoring component 16, 58, 58' are configured to be paired with one another. In one example, the sensor 12, 52, 52' and the monitoring component 16, 58, 58' may be paired and configured to communicate with one another (e.g., via Bluetooth communication). The sensor 12, 52, 52' may be configured to communicate with the item of merchandise 14 using the connection between the sensor and the item of merchandise (e.g., a USB connection). Thus, two-way communication between the sensor 12, 52, 52' and the item of merchandise 14 may occur. In this embodiment, the monitoring component 16, 58, 58' may be configured to be paired with any desired item of merchandise 14, such that pre-programming of the identification of the item of merchandise into the monitoring component is not required. In one example, once the sensor 12, 52, 52' is coupled to the item of merchandise 14, the monitoring component 16, 58, 58' may automatically be paired with the sensor in order to exchange data therebetween. In this embodiment, the monitoring component 16, 58, 58' is configured to filter out other data being transmitted by surrounding sensors 12, 52, 52' and items of merchandise 14 in order to be paired with the desired sensor. Thus, where the monitoring component 16, 58, 58' is capable of detecting a plurality of sensors, the monitoring component is able to filter out all other sensors except for the sensor 12, 52, 52' desired to be monitored. In one embodiment, the sensor 12, 52, 52' may be configured to control certain features of the item of merchandise 14, such as, for example, flashing LEDs, generating audible signals, etc. In a further embodiment, the monitoring component 16, 58, 58' may be configured to be simultaneously paired with the sensor 12, 52, 52' and the item of merchandise 14. As such, the monitoring component 16, 58, 58' may be configured to communicate directly with the item of merchandise 14 and the sensor 12, 52, 52'. For example, the monitoring component 16, 58, 58' could exchange data directly with the item of merchandise 14, such as via text and/or audio messages.

Using any one or combination of the aforementioned techniques, the monitoring component 16, 58, 58' may be configured to determine whether the proximity of the item of merchandise 14 relative to the monitoring component has exceeded at least one threshold value based upon the distance traveled by the item of merchandise from the home position 70. For example, the monitoring component 16, 58, 58' may determine whether the item of merchandise 14 has been moved more than a predetermined distance in any radial direction from the home position 70 based on the signal strength and/or data being communicated between the monitoring component and the item of merchandise and/or the sensor 12, 52, 52'. Of course, the threshold proximity may be set to any desired value, or alternatively, to another variable, such as distance, time, acceleration, orientation, etc. In particular, the threshold variable may be set to any desired value of any suitable variable via programming using the input device(s) 14C, or wirelessly via the wireless communications circuitry 141 (see, e.g., FIG. 14). Alternatively, the memory of the controller 14J of the item of merchandise 14 may be pre-programmed with one or more predetermined threshold variables and/or values. In addition, as discussed above, a calibration routine may be employed to dynamically customize a desired threshold distance.

Regardless, when the threshold proximity has been exceeded, the monitoring component 16, 58, 58' may be configured to communicate with the alarm component 18, 58, 58' to generate a security signal, such as a visual, an audible, and/or a haptic alarm. For example, the security signal may be an audible voice message requesting that the item of merchandise 14 be returned to the home position 70 within a specified period of time. The voice message may be customizable in that it may be set to be a male or female voice, and/or may be set to speak in a predetermined language or to speak in one or more of multiple languages. The monitoring component 16, 58, 58' alternatively or additionally may activate other output devices 14E, for example, a haptic (e.g. vibration) device or a visual (e.g. flashing LED) device. The monitoring component 16, 58, 58' may also be configured to communicate with the sensor 12, 52, 52' and/or the item of merchandise 14 to cause the sensor and/or the item of merchandise to initiate or otherwise generate a security signal.

In some embodiments, there may be more than one threshold, for example a first threshold and a second threshold. When the monitoring component 16, 58, 58' determines a first threshold proximity has been exceeded, the monitoring device may initiate an initial "warning" via the sensor 12, 52, 52' and/or the item of merchandise (see, e.g., 76 in FIG. 16). The warning may be a voice, as noted above, and may indicate for example that unless the item of merchandise 14 is returned to the home position 70 or is brought back within the first threshold proximity, an alarm will be activated. Alternatively, the warning may be an audible and/or a visible signal. The warning may be initiated when the sensor 12, 52, 52' is moved a particular percentage of the proximity range (e.g., greater than 50%). If the item of merchandise 14 is not timely returned to the home position or to a location within the first threshold proximity, and instead, the second threshold proximity is exceeded, the monitoring component 16, 58, 58' may initiate a subsequent alarm, such as an audible siren, via the alarm module, the sensor, and/or the item of merchandise (see, e.g., 78 in FIG. 16). The subsequent alarm could be greater in volume and/or frequency than the initial alarm (see, e.g., 76 in FIG. 16). Moreover, the item of merchandise 14 may be configured to generate various security signals as discussed above, such as, for example, a warning message to the consumer that the item of merchandise is secure, a thank-you message to the consumer when a security condition is rectified, an alarming signal, etc. In addition, security signals may be generated in conjunction with any of the aforementioned techniques along with actions that occur in predetermined time increments. For example, the consumer may be allowed a predetermined time period following a warning signal to correct the issue, or a warning signal may be generated when an item of merchandise 14 remains from the home position 70 for longer than a predetermined period of time. Furthermore, visible signals may be generated in response to various conditions, such as a flashing visible signal at the alarm component 18, 58, 58'.

Still further, the monitoring component 16, 58, 58' may cooperate with the sensor 12, 52, 52' and/or the item of merchandise 14 to wirelessly transmit instructions to activate another output device 14E, such as a store alarm remote from the item of merchandise and the display area. As will be appreciated by those skilled in the art, the monitoring component 16, 58, 58' may likewise communicate instructions to other security systems and/or devices to perform additional operations. In one example, the monitoring component 16, 58, 58' may instruct adjacent monitoring components in communication with other sensors 12, 52, 52' and/or items of merchandise 14 to enter a "lockdown mode" so that the other items of merchandise cannot be removed and stolen. Lockdown may be achieved by mechanical, magnetic, electrical, electromechanical or electromagnetic locks, as will be understood by those skilled in the art.

The monitoring component 16, 58, 58' may be configured to deactivate a security signal upon the item of merchandise 14 being returned within the first or second threshold proximity, for example. Alternatively or additionally, the monitoring component 16, 58, 58' may disable the security signal based upon an input from an input device 14C, for example, a security code entered into the item of merchandise 14, or presenting a key to the alarm component 18, 58, 58', sensor 12, 52, 52', and/or the item of merchandise. The monitoring component 16, 58, 58' may also deactivate the security signal wirelessly via the wireless communications circuitry, or via a key, such as a mechanical, magnetic, electrical, optical or infrared key fob device. Of course, the monitoring component 16, 58, 58' may perform additional and/or other communications functions upon an alarm condition, as will be appreciated by those skilled in the art including, for example, disabling one or more functions, capabilities, or operations of the item of merchandise.

Figure 18:
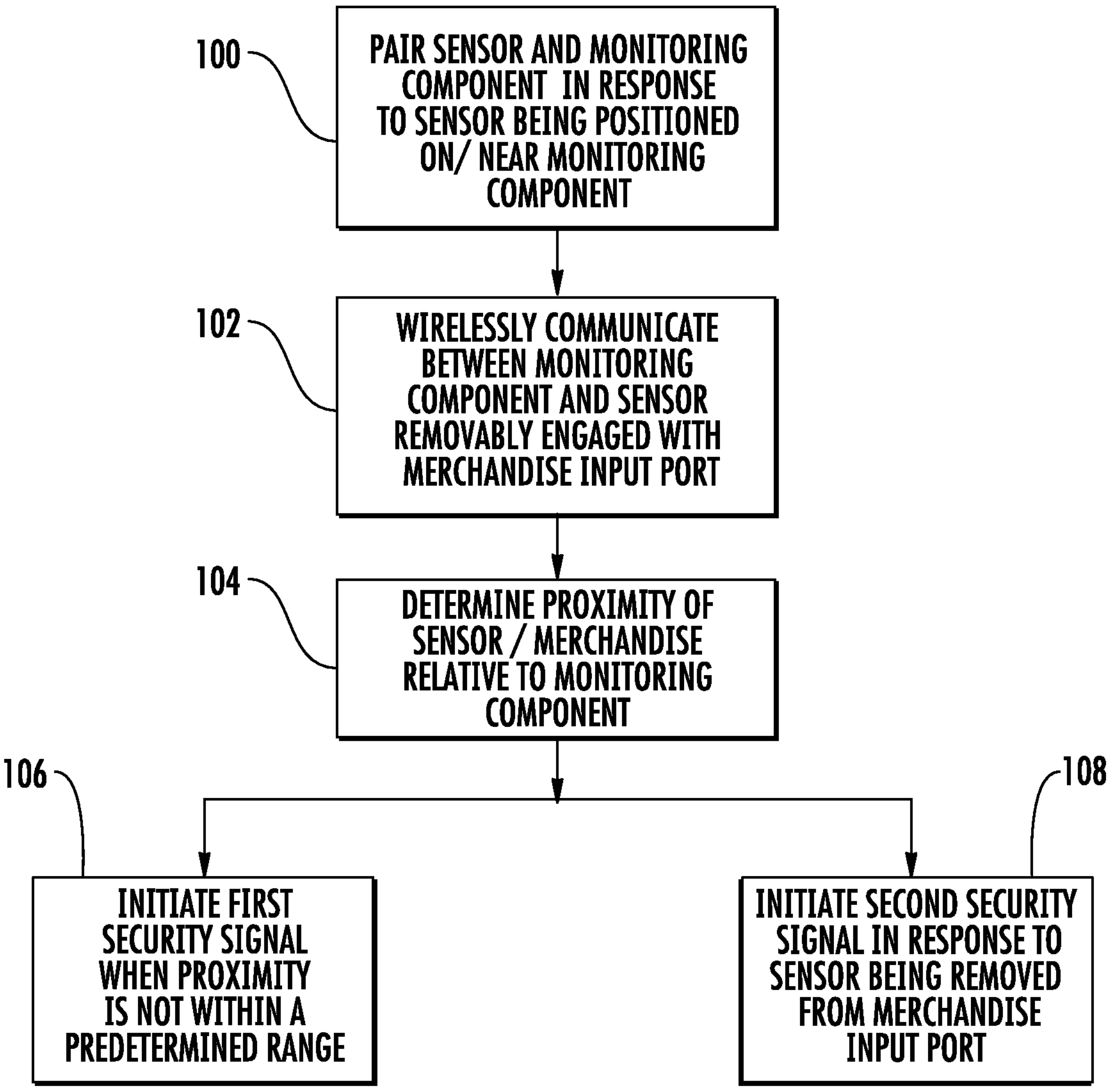
FIG. 18 is a flowchart of another method for securing an item of merchandise from theft in a retail display according to one embodiment of the invention.

In another embodiment of a method according to the invention illustrated in FIG. 18, the sensor 12, 52, 52' and the monitoring component 16, 58, 58' (e.g., monitoring device, display stand, or watchtower or "WT") are paired together in response to the sensor being positioned on or near the monitoring component 16, 58, 58', as indicated in FIG. 18 by reference character 100. The monitoring component 16, 58, 58' and the sensor 12, 52, 52' wirelessly communicate between one another (e.g., via Bluetooth communication) with the sensor being removably engaged with an input port provided on the item of merchandise 14, as indicated in FIG. 18 by reference character 102. The monitoring component 16, 58, 58' continuously determines the proximity of the sensor 12, 52, 52' and the item of merchandise 14 relative to a home position such as the monitoring component, in any manner previously described, as indicated in FIG. 18 by reference character 104. The monitoring component 16, 58, 58' may communicate with the alarm component 18, 58, 58' to initiate or otherwise generate a first security signal when the proximity between the monitoring component and the sensor 12, 52, 52' is not within a predetermined range, as indicated in FIG. 18 by reference character 106. Additionally, or alternatively, the monitoring component 16, 58, 58' may communicate with the alarm component 18, 58, 58' to initiate or otherwise generate a second security signal in response to the sensor 12, 52, 52' being removed from the input port provided on the item of merchandise 14, as indicated in FIG. 18 by reference character 108.

It should be noted that the operations executed by the sensor 12, 52, 52', the monitoring component 16, 58, 58', the alarm component 18, 58, 58', and/or the item of merchandise 14 for any of the embodiments disclosed herein may be provided by a computer-readable medium, memory, or other storage medium. Many modifications and other embodiments of the invention will be readily apparent to one skilled in the art having the benefit of the teachings presented in the foregoing descriptions and the associated drawings. Therefore, it is understood and appreciated that the invention is not to be limited to the specific embodiments disclosed herein, and that modifications to the disclosed embodiments and other undisclosed embodiments are intended to be included within the scope of the appended claims.

That which is claimed is:

1. A security system comprising:
- a wireless device; and
- a monitoring component configured to wirelessly communicate with the wireless device, the wireless device configured to be moved relative to the monitoring component,
- wherein the wireless device and the monitoring component are configured to communicate with one another for initially setting a proximity range between the wireless device and the monitoring component,
- wherein the monitoring component and the wireless device are configured to communicate with one another after initially setting the proximity range,
- wherein the wireless device is configured to initiate a security signal when the wireless device is not within the proximity range.

2. The security system of claim 1, wherein the monitoring component is configured to be coupled to a remote power source for providing power to the wireless device.

3. The security system of claim 1, wherein the monitoring component and the wireless device are each configured to initiate a security signal when the wireless device is not within the proximity range.

4. The security system of claim 1, wherein the wireless device and the monitoring component are configured to wirelessly communicate to determine a proximity of the wireless device relative to the monitoring component.

5. The security system of claim 1, wherein the monitoring component and the wireless device are each configured to communicate with a key for arming or disarming the monitoring component and/or the wireless device.

6. The security system of claim 1, wherein the wireless device and the monitoring component are configured to be paired to one another in response to the wireless device being positioned on the monitoring component.

7. The security system of claim 1, wherein the monitoring component comprises a display stand.

8. The security system of claim 1, wherein the proximity range is a range between a home display position of the wireless device and a maximum allowable location from the home display position.

9. The security system of claim 1, wherein the wireless device and the monitoring component are configured to communicate with one another for initially setting the proximity range in response to communication with a key.

10. The security system of claim 1, wherein the wireless device is a portable electronic device.

11. The security system of claim 1, wherein the wireless device is a sensor.

12. The security system of claim 11, wherein the sensor comprises a cable and a connector at the end of the cable, wherein the connector is configured to removably engage an input port of a portable electronic device, and wherein the sensor is configured to initiate a security signal in response to the connector being removed from the input port of the portable electronic device.

13. The security system of claim 1, wherein the wireless device comprises a memory for storing computer-executable instructions configured to cause the wireless device to communicate with the monitoring device.

14. A method for securing a portable electronic device from theft, the method comprising:
- wirelessly communicating between a monitoring component and a wireless device, the wireless device configured to be moved relative to the monitoring component;
- initially setting a proximity range in response to communication between the wireless device and the monitoring component;
- subsequent to initially setting the proximity range, determining whether the wireless device is within the proximity range; and
- initiating a security signal at the wireless device when the wireless device is not within the proximity range.

15. The method of claim 14, wherein initiating the security signal comprises generating the security signal at each of the monitoring component and the wireless device.

16. The method of claim 14, further comprising determining a proximity of the wireless device relative to the monitoring component.

17. The method of claim 14, wherein initially setting comprises initially setting the proximity range in response to communication with a key.

18. The method of claim 17, further comprising receiving a signal from the key at the wireless device.

19. The method of claim 14, wherein the wireless device is a portable electronic device, and wherein wirelessly communicating comprises wirelessly communicating between a portable electronic device and the monitoring component.

20. The method of claim 14, wherein the wireless device is a sensor, and wherein wirelessly communicating comprises wirelessly communicating between the sensor and the monitoring component.

* * * * *